United States Patent
Usui et al.

(10) Patent No.: US 6,807,055 B2
(45) Date of Patent: Oct. 19, 2004

(54) CONNECTION ENHANCEMENT APPARATUS AND INFORMATION PROCESSING APPARATUS

(75) Inventors: Hideyuki Usui, Chigasaki (JP); Hiroaki Agata, Yokohama (JP); Kazuhiko Yamazaki, Hiratsuka (JP)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 09/978,519

(22) Filed: Oct. 16, 2001

(65) Prior Publication Data

US 2002/0048151 A1 Apr. 25, 2002

(30) Foreign Application Priority Data

Oct. 19, 2000 (JP) ........................................ 2000-319367

(51) Int. Cl.[7] .................................................. G06F 1/16
(52) U.S. Cl. ........................ 361/686; D14/434; 710/303
(58) Field of Search ................................ 361/686, 683, 361/679; D14/300–434; 710/303, 304; 395/281–283

(56) References Cited

U.S. PATENT DOCUMENTS

| | | | | |
|---|---|---|---|---|
| 5,544,010 A | * | 8/1996 | Schultz et al. ............. | 361/686 |
| 5,619,397 A | * | 4/1997 | Honda et al. ............... | 361/686 |
| 5,687,060 A | * | 11/1997 | Ruch et al. ................. | 361/686 |
| 5,822,185 A | * | 10/1998 | Cavello ...................... | 361/686 |
| 5,826,042 A | * | 10/1998 | Kirkendoll .................. | 710/303 |
| D411,835 S | * | 7/1999 | Mizusugi et al. .......... | D14/434 |
| 6,091,602 A | * | 7/2000 | Helot ......................... | 361/686 |
| 6,208,508 B1 | * | 3/2001 | Ruch et al. ................. | 361/686 |
| 6,256,193 B1 | * | 7/2001 | Janik et al. ................. | 361/683 |
| 6,353,529 B1 | * | 3/2002 | Cies ........................... | 361/681 |
| 6,480,376 B1 | * | 11/2002 | Nguyen et al. ............. | 361/686 |
| 6,490,154 B2 | * | 12/2002 | Thompson .................. | 361/686 |
| 6,519,143 B1 | * | 2/2003 | Goko ......................... | 361/686 |
| 6,556,435 B1 | * | 4/2003 | Helot et al. ................. | 361/686 |

FOREIGN PATENT DOCUMENTS

EP                834793 A2  *  4/1998  ............. G06F/1/16

* cited by examiner

Primary Examiner—Lisa Lea-Edmonds
(74) Attorney, Agent, or Firm—Carlos Munoz-Bustamante

(57) ABSTRACT

A docking station is provided with a floppy disk drive and a CD-ROM drive used to extend a function of a lap-top PC. A station body has a pocket formed so as to house and hold the lap-top PC therein. The docking station is of a vertical type and the lap-top PC is also held as a vertical position therein. Consequently, the docking station is effective in space-saving. In addition, because the lap-top PC can be docked to the docking station from the front side of the docking station, the docking can be done safely and easily.

8 Claims, 21 Drawing Sheets

FIG. 7
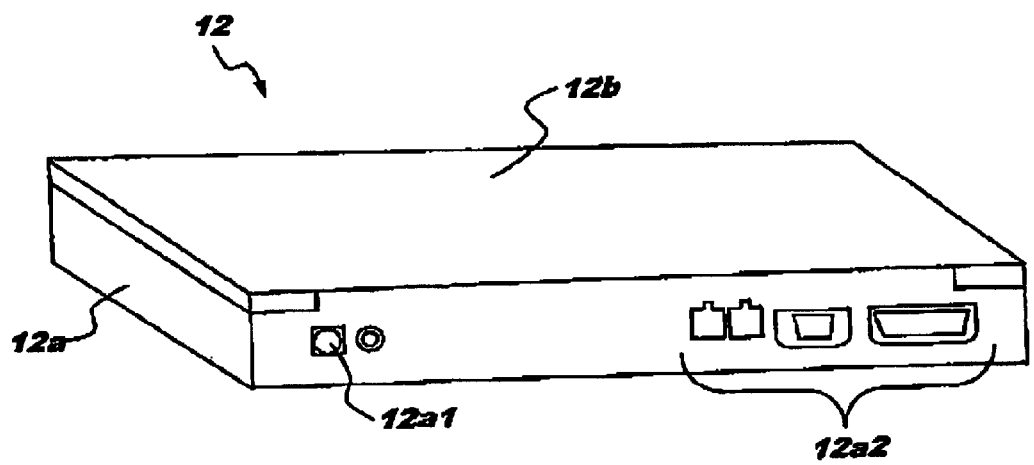
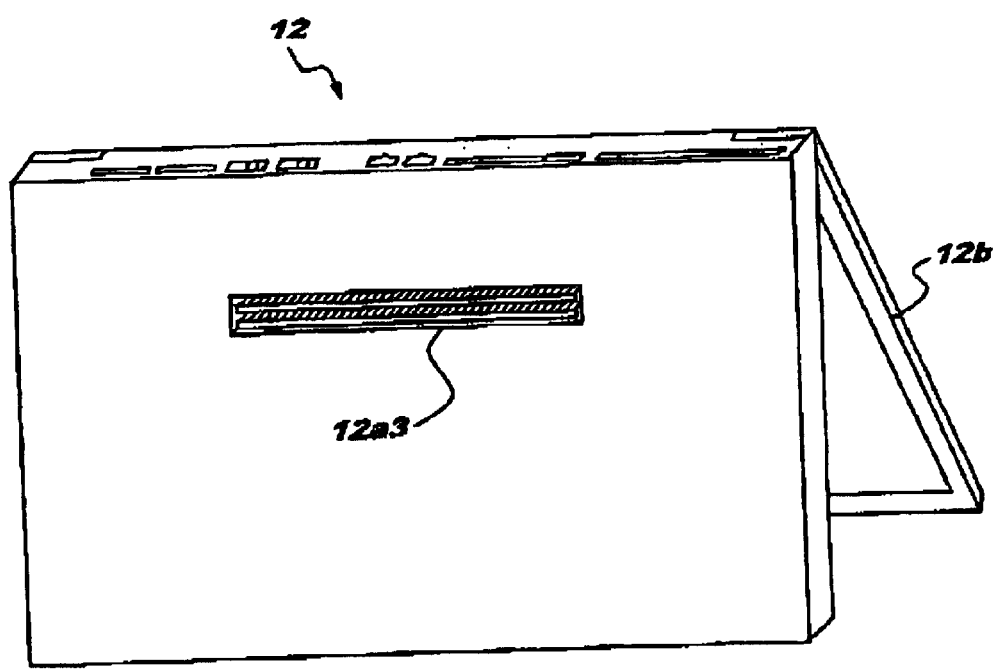

CONNECTION ENHANCEMENT APPARATUS AND INFORMATION PROCESSING APPARATUS

BACKGROUND OF THE INVENTION

The present information relates to an connection enhancement apparatus employed effectively for extending the function of such a portable information processing apparatus as a lap-top personal computer (hereinafter, to be referred as the lap-top PC), etc.

The progress of personal computers in recent years has been remarkable and are now indispensable in office work. Personal computers are roughly classified into two types; desk-tops installed in offices and lap-tops excellent their portability. Both types are often used in office work environments. In the case where both types of personal computers are used, however, handling their data often becomes a complicated task.

For desk-top personal computers, there is no need to take portability into consideration. Concretely, because there is no need to reduce size, the PC is often provided with such devices as a floppy disk drive, a CD-ROM drive, an extension terminal, etc. as required to expand the function of the PC. On the contrary, a lap-top PC must often make sacrifices for functional expandability so as to satisfy portability. For example, many lap-top personal computers are not provided with any external storage units, such as a floppy disk drive, a CD-ROM drive, etc. Where a lap-top PC whose functions are limited is used in an office, therefore, an connection enhancement apparatus referred to as a docking station is used so as to extend function. The docking station has an enhancement connector that supports connections of a plurality of I/O ports of the subject lap-top PC. The docking station can thus be taken as an connection enhancement apparatus. As such, the docking station has various functions that are not provided for lap-top PCs, a lap-top PC, when it is connected to such a docking station, can function just like a desk-top PC. Consequently, the use of such a docking station will solve the troublesome data handling which arises when two types of PCs (lap-top PCs and desk-top PCs) are used together.

Japanese Published Unexamined Patent Application No. 8-22342 discloses a docking station to which a lap-top PC is connected and disconnected automatically. This docking station includes a housing provided with connector means to be connected to a full-size monitor and a keyboard. A tray, for fit to a lap-top PC, is slidably attached to this housing. Driving means disposed between the housing and the tray drives both of the lap-top PC and the tray, so that the connection means of the docking station is fit in the connection means of the lap-top PC automatically. The docking station disclosed in Japanese Published Unexamined Patent Application No. 8-22342 employs a CRT (Cathode Ray Tube) as a monitor, so it requires a due installation space.

Another docking station is disclosed in Japanese Published Unexamined Patent Application No. 11-305870. The docking station, which is a space-saving one, uses a thin display, for example, a liquid crystal display. According to Japanese Published Unexamined Patent Application No. 11-305870, the docking station disclosed employs such a thin display and enables a lap-top PC to be connected thereto behind this display so as to be disposed vertically, thereby space-savings can be achieved.

The docking station disclosed in Japanese Published Unexamined Patent Application No. 11-305870 can have functions equivalent to those of a desk-top PC so that the space-saving does not degrade the controllability. In spite of this, the docking station disclosed in Japanese Published Unexamined Patent Application No. 11-305870 exemplifies the problem of workability when a lap-top PC is docked to the docking station behind the display. Concretely, when the lap-top PC is docked to the docking station, the lap-top PC must be docked over the display while the PC is held vertically in the installation direction. And, it is difficult to dock the PC in such a way even when the PC is light in weight. The PC can be moved around to the rear of the display without moving the PC over the top of the display so as to dock the PC to the docking station. In some installations of the docking station, however, the PC cannot be moved around to the rear of the display. Any way, the user might be forced to take up an unstable posture so as to dock the lap-top PC to this docking station. In the worst case, the user might drop the lap-top PC while he/she is docking it to the docking station.

Under such circumstances, one purpose is to provide an connection enhancement apparatus that makes it easier to connect the subject PC thereto. It is another purpose of the present invention to provide a space-saving connection enhancement apparatus.

SUMMARY OF THE INVENTION

Docking of a lap-top PC to the docking station would become easier in the case where it is done from a surface in front of the user. In addition, space-saving can be achieved in the case where both of the docking station and the lap-top PC are disposed vertically. In order to achieve the above, therefore, the present invention provides a docking station and enhancement connection including: an enhancement connector for supporting connections of a plurality of I/O ports of a portable information processing apparatus; a vertical type housing having a front surface on which the enhancement connector is installed, the front surface facing the user; and a holding member holds the portable information processing apparatus substantially parallel to the front surface.

Because the connection enhancement apparatus or docking station of the present invention is vertical, the installation space is reduced so as to achieve space-saving. And, the connection enhancement apparatus of the present invention has a holding member to hold a portable information processing apparatus substantially in parallel to the front surface. Consequently, because the portable information processing apparatus held by the holding member is disposed almost in parallel to the front surface, the space-saving is achieved with no difficulty. In addition, because this holding member holds the portable information processing apparatus within the plane of the projected front surface, the portable information processing apparatus and the connection enhancement apparatus, upon connection by a user to each other, visually reveals and readily invites proper connection, orientation, and unification.

A lap-top PC is a typical example of the portable information processing apparatus employed for the connection enhancement apparatus of the present invention. The portable information processing apparatus of the present invention, however, is not limited only to such a lap-top PC; it includes a wide variety of information processing apparatuses with portability, such as a compact lap-top PC, a PDA (Personal Digital Assistants), or the like.

And, the connection enhancement apparatus of the present invention is not limited only to a docking station; its concept also includes a port replicator. The port replicator can eliminate a troublesome work for connecting a plurality of connectors to a plurality of I/O ports of the subject lap-top PC. Concretely, the port replicator is connected to a plurality of connectors in advance, thereby it can be connected to a lap-top PC via minimum connectors, for example, only one connector. The connector of the port replicator to be connected to the lap-top PC functions as an enhancement connector.

The connection enhancement apparatus of the present invention can have a device for extending the function of the portable information processing apparatus. This device is not limited only to a specific one. In the case of a thin type lap-top PC, it is often provided with none of a floppy disk drive and a CD-ROM drive. In such a case, the connection enhancement apparatus comes to have a floppy disk drive and a CD-ROM drive. The type of the device is not limited at all; any device can be used where functions are not provided for in the subject portable information processing apparatus.

Furthermore, such I/O ports as line-in, line-out, IEEE 1394, modem, Ethernet, CRT, USB, digital video, FDD, mouse, keyboard, power supply, etc. may be employed as a plurality of the I/O ports of the portable information processing apparatus. They are just examples, however. These elements never restrict the present invention.

In the case of the connection enhancement apparatus of the present invention, because the holding member is formed on the front surface, the portable information processing apparatus can be connected to the connection enhancement apparatus from the front side of the connector apparatus. Consequently, there is no need to align or move the portable information processing apparatus over the connection enhancement apparatus for the connection, thereby the docking can be done more safely and easily.

The connection enhancement apparatus of the present invention can have an image display unit. The image display unit is positioned in front of the user. Generally, the image display unit attached to the connection enhancement apparatus is adjustable in tilting angle. Because the connection enhancement apparatus of the present invention enables the portable information processing apparatus to be connected thereto from a surface in front of the user as described above, it is required to attach the image display unit to the connection enhancement apparatus so as to be adjustable in tilting angle and to not prevent the portable information processing apparatus from being held by the holding member.

Furthermore, because the connection enhancement apparatus of the present invention can connect the portable information processing apparatus from the front surface, the connector for connecting the portable information processing apparatus should preferably be provided on the front surface.

The present invention also provides another connection enhancement apparatus having an enhancement connector for supporting connections of a plurality of I/O ports of a panel-like portable information processing apparatus. The connection enhancement apparatus includes: a housing connected to the enhancement connector; a holding member keeps the housing and the portable information processing apparatus connected substantially vertical to an installation surface on which the connection enhancement apparatus is installed; and a stopper connects and supports the portable information processing apparatus to the housing.

Because the connection enhancement apparatus of the present invention has the holding member which keeps the housing and the portable information processing apparatus connected nearly vertically to the installation surface on which the connection enhancement apparatus is disposed as described above, it is possible to connect the portable information processing apparatus to the connection enhancement apparatus from the front side of the connection enhancement apparatus when the holding member is positioned in front of the user/operator. The docking can thus be done safely and easily.

The connection enhancement apparatus of the present invention further includes a pocket having an opening almost vertically to the installation surface on which the connection enhancement apparatus is installed and being enabled to house the portable information processing apparatus disposed almost vertically to the installation surface. The stopper can be formed on any one of the four side walls of the pocket. The pocket of this connection enhancement apparatus is one of the forms of the holding member. In the case where the portable information processing apparatus is housed in the pocket, this stopper is engaged with one side end of the portable information processing apparatus while the other end is pressed against the pocket so as to ensure the docking. Especially, in the case where a connector is provided in this pocket so as to connect the portable information processing apparatus, it would become more effective for the connection between the connectors of the connection enhancement apparatus and the portable information processing apparatus. In the case of the connection enhancement apparatus of the present invention, the pocket can be formed on the largest one of the housing walls. Concretely, because it is possible to form the pocket on the housing of the connection enhancement apparatus and dock the portable information processing apparatus to the connection enhancement apparatus in the pocket, the portable information processing apparatus and the connection enhancement apparatus connected to each other look like and invite being unified by virtue of their external appearance upon visual inspection. In addition, forming the pocket on the largest wall of the housing walls compels that the connection enhancement apparatus be installed on another wall of the housing. In this case, the housing becomes a vertical type of housing. This is effective for space-saving.

Furthermore, in the case of the connection enhancement apparatus of the present invention, the stopper may be a sliding table enabled to hold the portable information processing apparatus almost vertically to the installation surface and being moved to and from the pocket. The portable information processing apparatus placed on the sliding table can thus be moved towards the holding member. Also in this case, when a connector is provided at a predetermined position of the holding member so as to connect the portable information processing apparatus, it is possible to hold the portable information processing apparatus, as well as to enable the connection between the connectors of the connection enhancement apparatus and the portable information processing apparatus.

Furthermore, the connection enhancement apparatus of the present invention can further include a flexible member extended from the housing and a connector member used to connect the portable information processing apparatus attached to the flexible member. According to this connection enhancement apparatus, the connector member can be moved within a predetermined range with respect to the housing, that is, the connection enhancement apparatus, since the connector member is connected to the housing via the flexible member. For example, it is also possible to place the connector member on the installation surface, connect the portable information processing apparatus in this state, then hold the portable information processing apparatus at the holding member. In this case, it is possible to connect the connectors to each other while the portable information processing apparatus is disposed in parallel to the installation surface. Thus, the portable information processing apparatus can be connected to the connection enhancement apparatus more stably, since holding the portable information processing apparatus in parallel to the installation surface can more effectively prevent the portable information processing apparatus from falling.

Furthermore, the present invention provides an information processing apparatus provided with a vertical type connection enhancement apparatus having a front surface facing the user who is operating and being enabled to support connections of a plurality of I/O ports and a portable information processing apparatus connected/disconnected to/from the connection enhancement apparatus from the front side surface.

This information processing apparatus can connect/disconnect the portable information processing apparatus to/from the connection enhancement apparatus freely, safely, and surely from the front side surface. In addition, because the connection enhancement apparatus is a vertical type one, it can achieve space-saving.

In the case of the information processing apparatus of the present invention, it is also possible to provide the portable information processing apparatus with an image display unit having an image display panel and the connection enhancement apparatus with the portable information processing apparatus respectively so that the image display panel faces the user who is operating it. The information processing apparatus of the present invention also enables the connection enhancement apparatus to have such an image display unit. In the case where the portable information processing apparatus is provided with an image display unit, the image display unit of the portable information processing apparatus can be used as the image display unit of the connection enhancement apparatus. Consequently, the manufacturing cost can be reduced relative to the connection enhancement apparatus provided with the image display unit. The above description of "so that the image display panel faces the user who is operating" just requires that an image display unit, when it can be folded/unfolded just like that of a lap-top PC, faces the user who is operating it.

Even the information processing apparatus described above can provide the connection enhancement apparatus with a pocket that houses the portable information processing apparatus.

BRIEF DESCRIPTION OF THE DRAWINGS

FIG. 7 is a perspective view of a lap-top PC to be docked to the docking station in the first embodiment of the present invention;

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

First Embodiment

Figure 1:
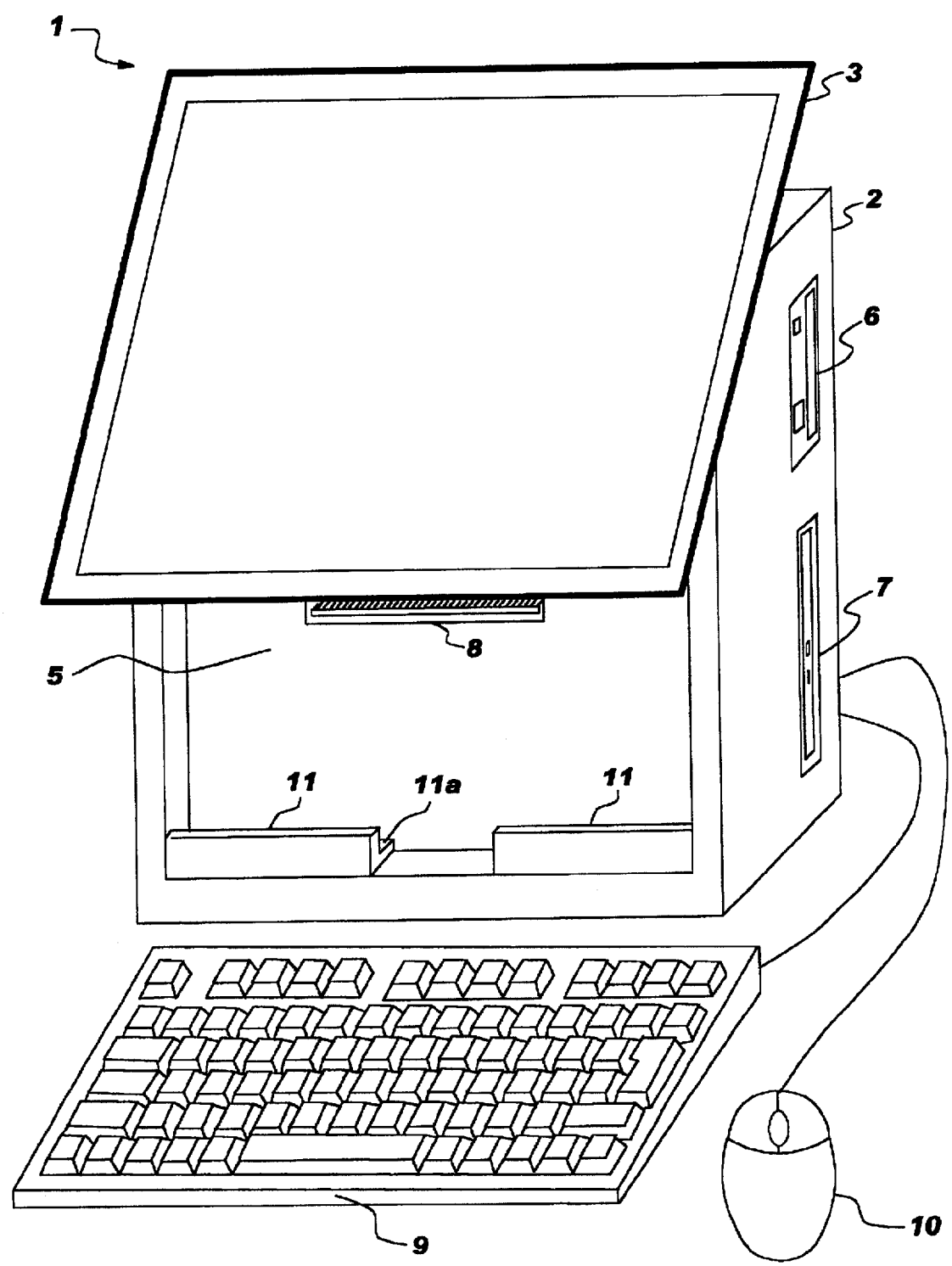
FIG. 1 shows an entire configuration of a docking station in a first embodiment of the present invention.

Referring now more particularly to the accompanying drawings, FIG. 1 is an entire view of a docking station 1 to which a lap-top PC 12 is connected. In FIG. 1, the docking station 1 includes a station body 2 for housing various devices and a liquid crystal panel 3, which is a thin display attached to the top of the station body 2.

The station body 2 also has a pocket 5 formed on its front surface facing the user who is operating and enabled to house and hold the lap-top PC 12 therein. This pocket 5 has an opening almost or nearly vertical to an installation surface on which the station body 2 is installed. On a vertical wall positioned in the depth of the pocket 5 are provided a enhancement docking connector 8 enabled to support the connections of connectors 12a3 of the lap-top PC 12. The station body 2 also incorporates a floppy disk drive 6 and a CD-ROM drive 7 used as functional extension devices of the lap-top PC 12 in itself. The floppy disk drive 6 and the CD-ROM drive 7 are inserted/ejected vertically in/from the drive ports provided on a side surface of the station body 2 as shown in FIG. 1. The cables led out of the rear side of the station body 2 are connected to the keyboard 9 and the mouse 10 used as external input devices.

A PC stopper 11 is formed on a lower wall of the pocket 5. And, a groove 11a is formed between the PC stopper 11 and the vertical wall of the pocket 5. The groove 11a is a little wider than the thickness of the lap-top PC 12. The lap-top PC 12, when it is docked to the docking station 1, is fit in the groove 11a of the PC stopper 11 and positioned there.

The liquid crystal display panel 3 is attached to the station body 2 adjustably in tilting angle. The liquid crystal display panel 3 is fastened at a torque sufficient to adjust the tilting angle and easily kept at a predetermined angle by the user. The liquid crystal display panel 3 is tilted as shown in FIG. 1 when in use. When the lap-top PC 12 is docked to the docking station 1, the tilting angle can be adjusted so as to not prevent docking by the user.

FIG. 7 shows a perspective view of the lap-top PC 12. The lap-top PC 12 is configured by a body 12a provided with a keyboard and the image display unit 12b provided with a liquid crystal display panel. The body 12a and the image display unit 12b are linked with each other by hinges so as to be opened and closed. On a side surface of the body 12a are provided a power supply connector 12a1 and an enhancement connector 12a2 used as I/O ports. While the docking station 1 is not used, a power supply adapter is connected to the power supply connector 12a1 and an extended device connector is connected to the enhancement connector 12a2. At the bottom of the body 12a is provided a docking connector 12a3. This docking connector 12a3 is connected to the enhancement docking connector 8 of the docking station 1.

Figure 2:
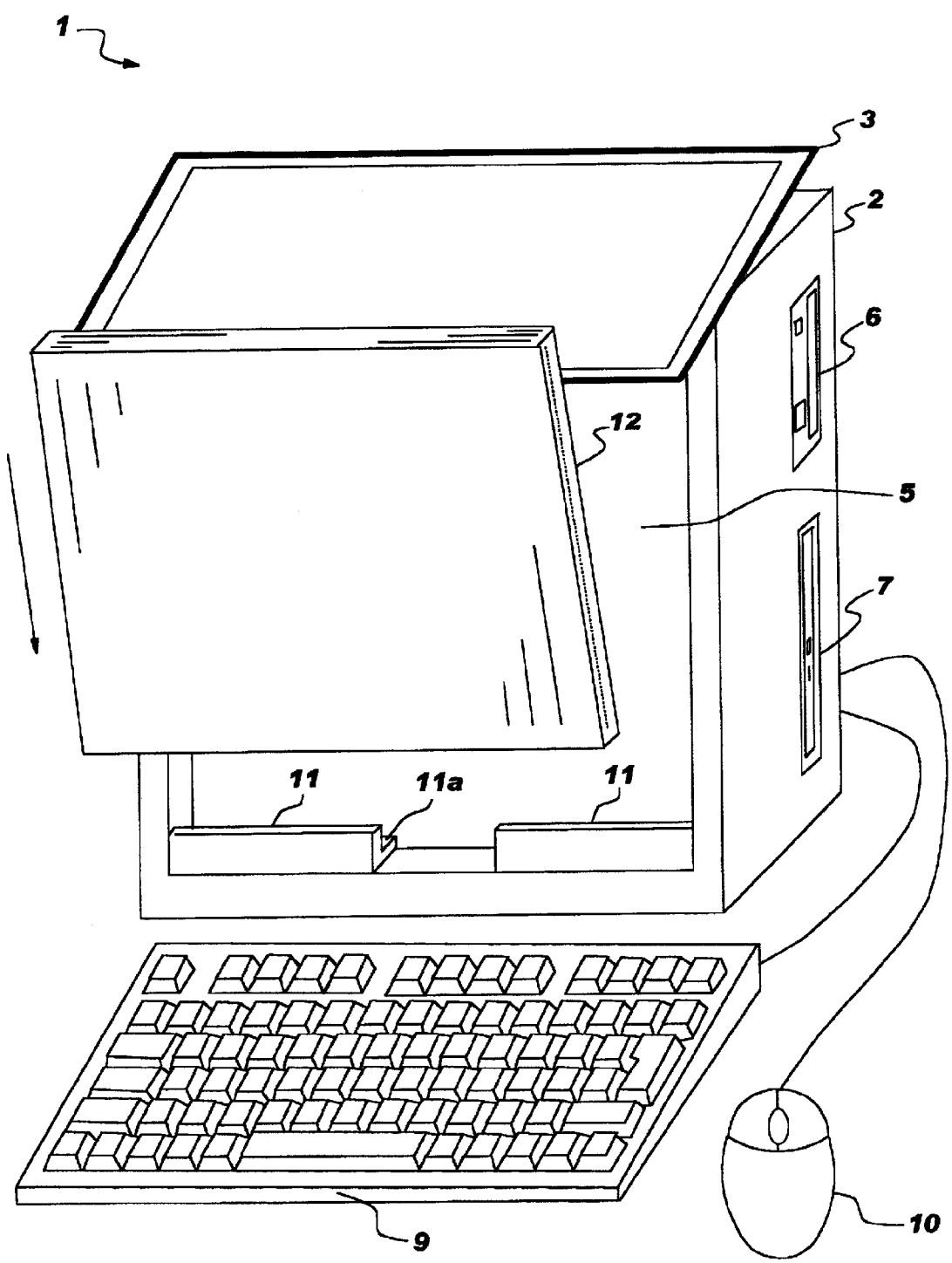
FIG. 2 is a perspective view showing how a lap-top PC is docked to the docking station in the first embodiment of the present invention.
Figure 3:
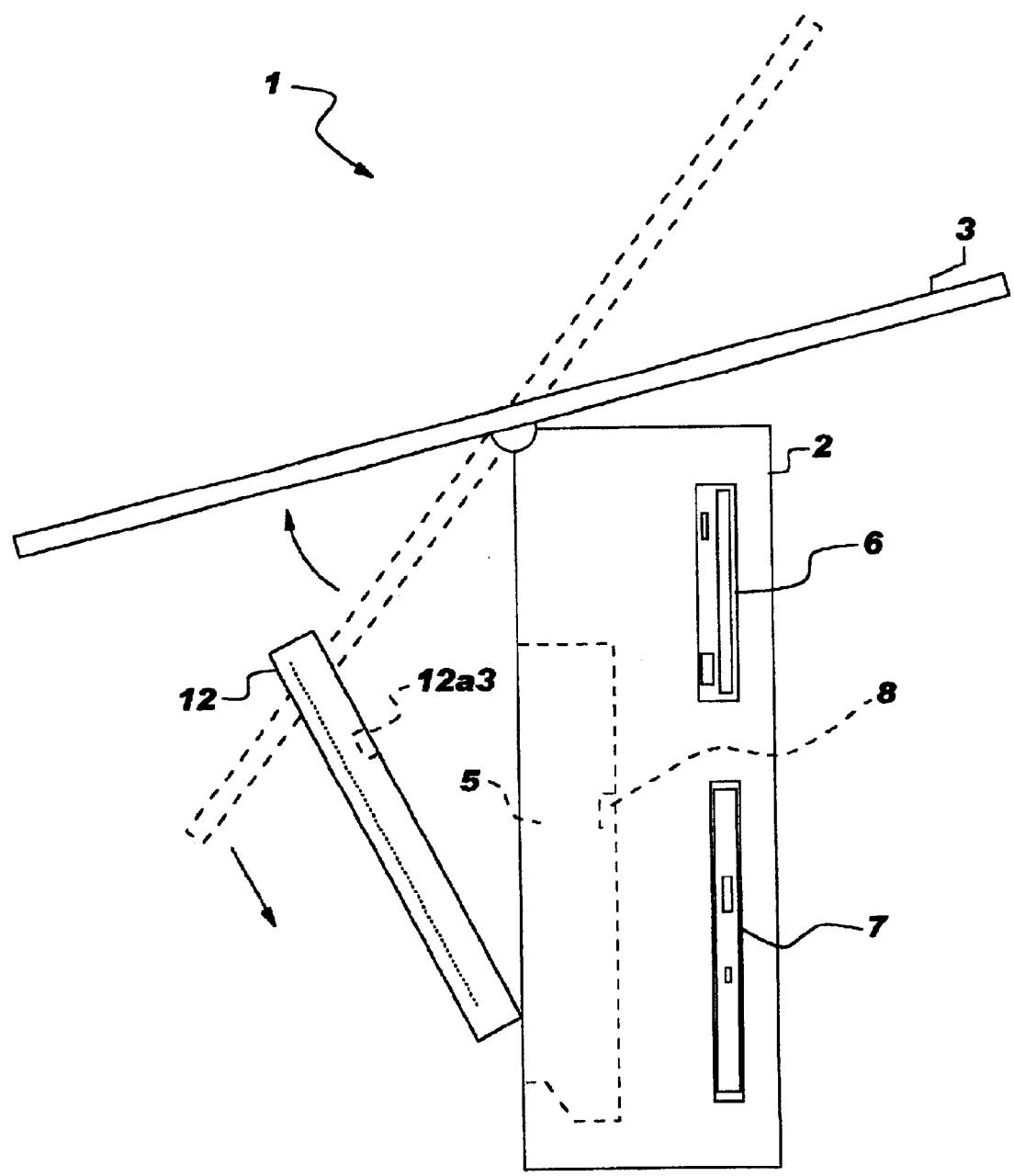
FIG. 3 is a side view showing how a lap-top PC is docked to the docking station in the first embodiment of the present invention.

FIG. 2 shows a perspective view showing how the lap-top PC 12 is docked to the docking station 1 in the initial state. FIG. 3 shows a side view of FIG. 2. When the lap-top PC 12 is docked to the docking station 1, the liquid crystal display panel 3 is turned clockwise so as not to obstruct the docking work. This also makes it easier to house the lap-top PC 12 in the pocket 5.

Figure 4:
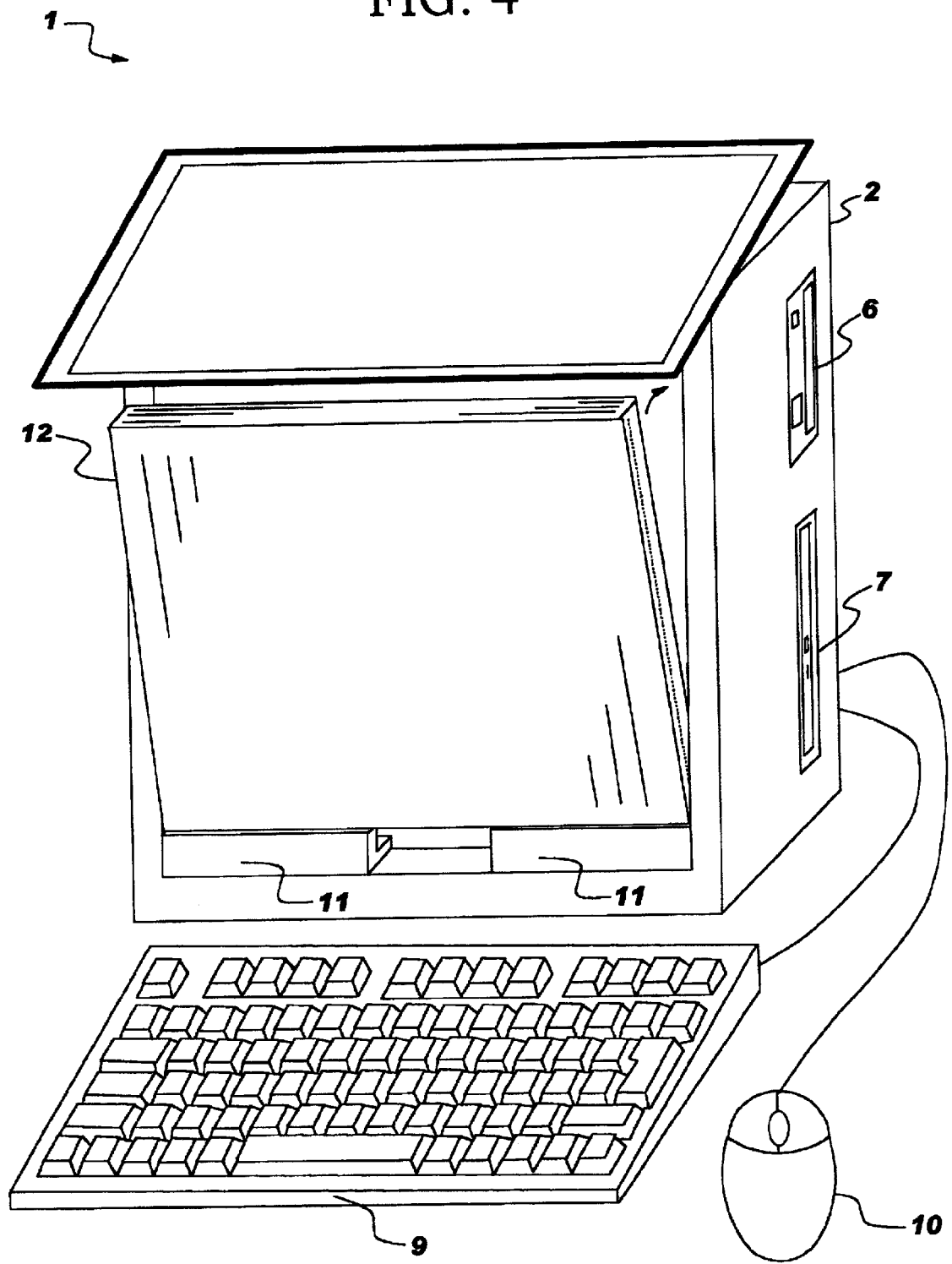
FIG. 4 is a perspective view showing how a lap-top PC is docked to the docking station in the first embodiment of the present invention.
Figure 5:
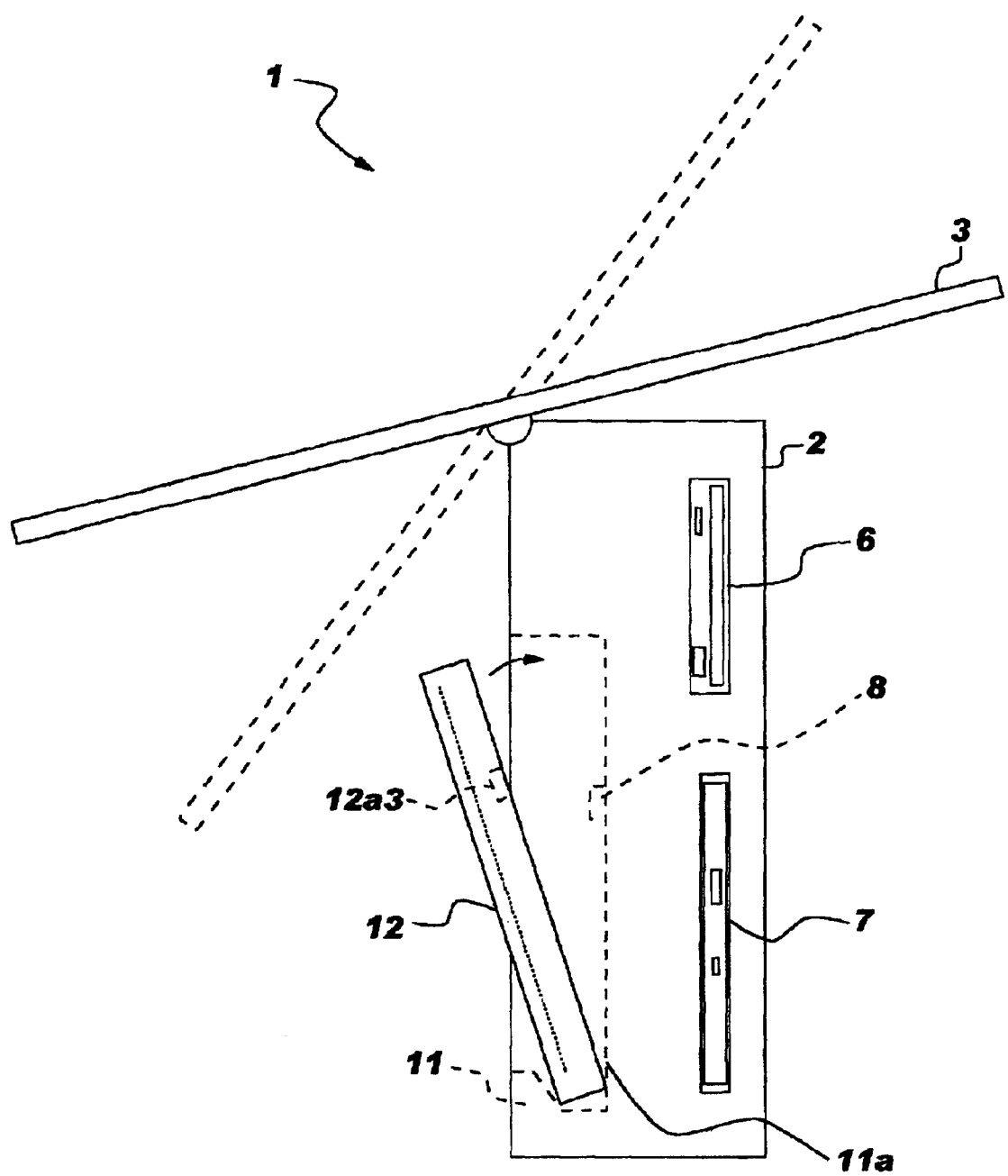
FIG. 5 is a side view showing how a lap-top PC is docked to the docking station in the first embodiment of the present invention.

FIG. 4 shows a perspective view showing how the lap-top PC 12 is docked to the docking station 1 just like in FIG. 2. FIG. 5 shows a side view of FIG. 4. In this stage, the lower portion of the lap-top PC 12 is fit in the groove 11a formed at the lower end of the pocket 5. In this state, the lap-top PC 12 is turned around the lower end portion as denoted by the arrow. The lap-top PC 12, when reaching a predetermined position, is housed in the pocket 5 and the docking connector 12a3 is connected to the enhancement docking connector 8 of the docking station 1. Because the lap-top PC 12 stops at the PC stopper 11 at this time, the connectors can be connected surely.

Figure 6:
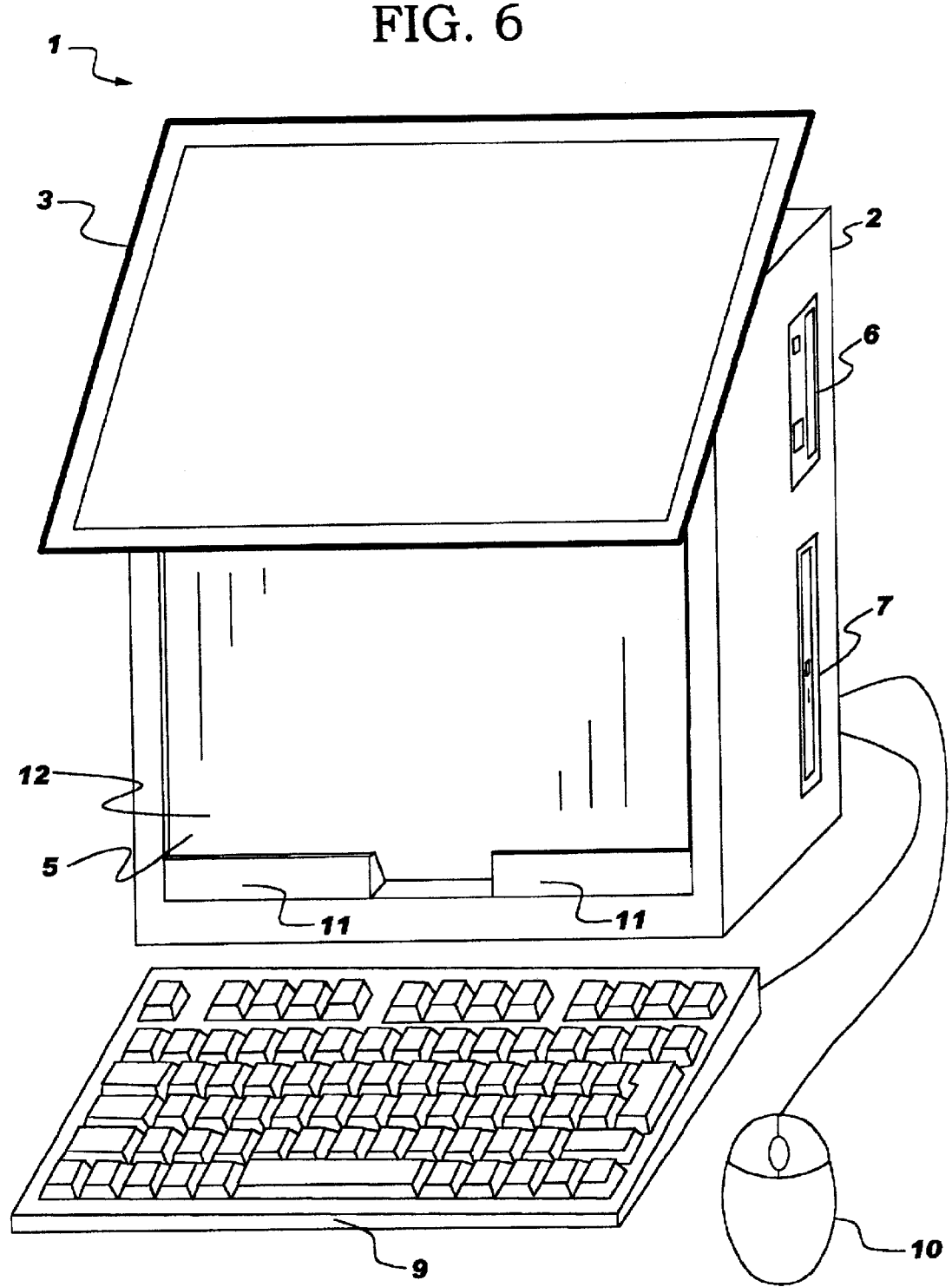
FIG. 6 is a perspective view showing a state where a lap-top PC is docked to the docking station in the first embodiment of the present invention.

FIG. 6 shows a perspective view showing how the lap-top PC 12 is docked to the docking station 1. The lap-top PC 12 is thus housed in the pocket 5 of the docking station 1. Because the lap-top PC 12 is positioned within the projected area of the pocket 5, that is, the docking station 1 such way, the lap-top PC 12 and the docking station 1 look to be unified on the external appearance after the docking. When the docking ends, the liquid crystal display panel 3 is tilted to position with respect to the station body 2.

Figure 8:
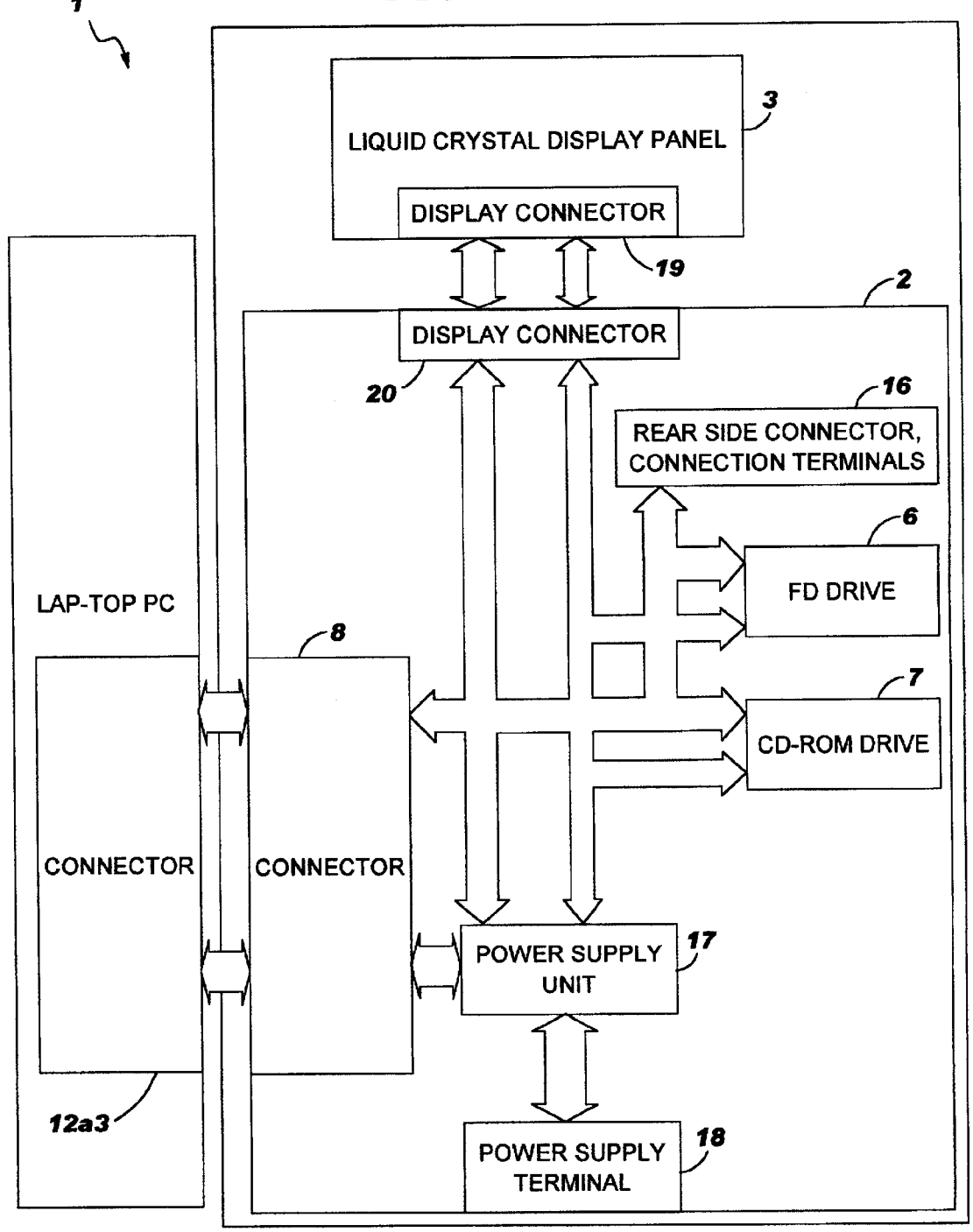
FIG. 8 is a block diagram showing a state where a lap-top PC is docked to the docking station in the first embodiment of the present invention.

FIG. 8 shows a block diagram of the docking station 1 to which the lap-top PC 12 is docked.

The docking station 1 and the lap-top PC 12 are connected to each other when the enhancement docking connector 8 of the docking station 1 is connected to the docking connector 12a3 of the lap-top PC 12. Because of this connection between the two connectors 8 and 12a3, signals and an electric power flows between them. The docking station 1 and the liquid crystal display panel 3 are thus connected to each other via their display connectors 19 and 20.

In the docking station 1, the enhancement docking connector 8 is connected to the display connector 20, the rear side connector/connection terminal group 16, the floppy disk drive (FD drive) 6, the CD-ROM drive 7, and the power supply unit 17 via signal lines.

The power supply unit 17 receives an electric power from an external power source via the power supply terminal 18. The power supply unit 17 supplies an electric power to the lap-top PC 12, the liquid crystal display panel 3, the floppy disk drive (FD drive) 6, and the CD-ROM drive 7 respectively.

Next, features of the docking station will be described.

The docking station 1 is of the so-called vertical type. The docking station 1 requires less installation area, so it is effective in saving space. In the case where a docking station is installed on the largest surface of the six surfaces of the housing, that is, a cube, the docking station can be referred to as a horizontal type. In the case where the docking station is installed on any of other surfaces, the docking station can be referred to as a vertical type. It is also possible to decide whether a docking station is of the vertical type or horizontal type according to the direction in which the floppy disk drive 6 and the CD-ROM drive 7 are disposed. Concretely, in the case where the floppy disk drive 6 and the CD-ROM drive 7 are disposed vertically to the installation surface just like the docking station 1, the subject docking station is referred to as a vertical type. In the case where the drives 6 and 7 are disposed in parallel to the installation surface, the docking station can be referred to as a horizontal type. And, because the docking station 1 enables the pocket 5 to be formed on the largest surface of the station body 2, another surface whose area is smaller than that of the surface is used as the installation surface. Concretely, the docking station 1 is of vertical type. In addition, the pocket 5 keeps the lap-top PC 12 almost vertically to the installation surface of the station body 2, the docking station 1 is effective in saving space. And, because the lap-top PC 12 is housed in the pocket 5, the docking station 1 and the lap-top PC 12 look, when they are connected to each other, unified, even on external appearance.

The docking station 1 is characterized by the direction in which the lap-top PC 12 is docked thereto. As described above, the lap-top PC 12 is docked to the docking station almost in parallel to each other in this embodiment. And, because the pocket for holding the lap-top PC 12 is formed on the front surface of the docking station 1, which faces the user/operator, the lap-top PC 12 can be docked from the front side of the docking station 1.

And, one side of the lap-top PC 12 is fit in the groove 11*a* formed at the pocket 5 when the lap-top PC 12 is connected to the docking station 1. After the fitting, the lap-top PC 12 is rotated around the inserted portion, thereby the enhancement docking connector 8 of the docking station 1 is connected to the docking connector 12*a*3 of the lap-top PC 12. And, because the lap-top PC 12 is already fit in the groove 11*a* when the enhancement docking connector 8 is connected to the docking connector 12*a*3, the user will less likely drop the lap-top PC 12 in this process.

The docking station 1 described above is designed so as to have the pocket 5 and hold the lap-top PC 12 in the pocket 5. However, the lap-top PC 12 may also be held without being fit in the pocket 5. For example, the docking station 1 may be provided with ratchets or the like for holding the lap-top PC 12. Consequently, the holding member of the present invention includes such a holding member form.

Furthermore, while the groove 11*a* is formed on the lower side wall of the pocket 5 in the docking station 1, the same effect can be assured even when the groove 11*a* is formed on the upper side wall or side wall.

Furthermore, while the lap-top PC 12 is held in the pocket 5 almost vertically to the installation surface of the docking station 1, that is, a vertical type docking station, the present invention is not limited only to such the vertical disposition; it may be inclined slightly. Even in such case, the space-saving will become more effective than any horizontal type docking stations.

Second Embodiment

Next, a second embodiment of the present invention will be described with reference to FIGS. 9 through 13.

The basic configuration of the docking station 21 in this second embodiment is the same as that of the docking station 1 in the first embodiment. The same reference numerals will therefore be given to the same items as those in the first embodiment, avoiding redundant description.

Figure 9:
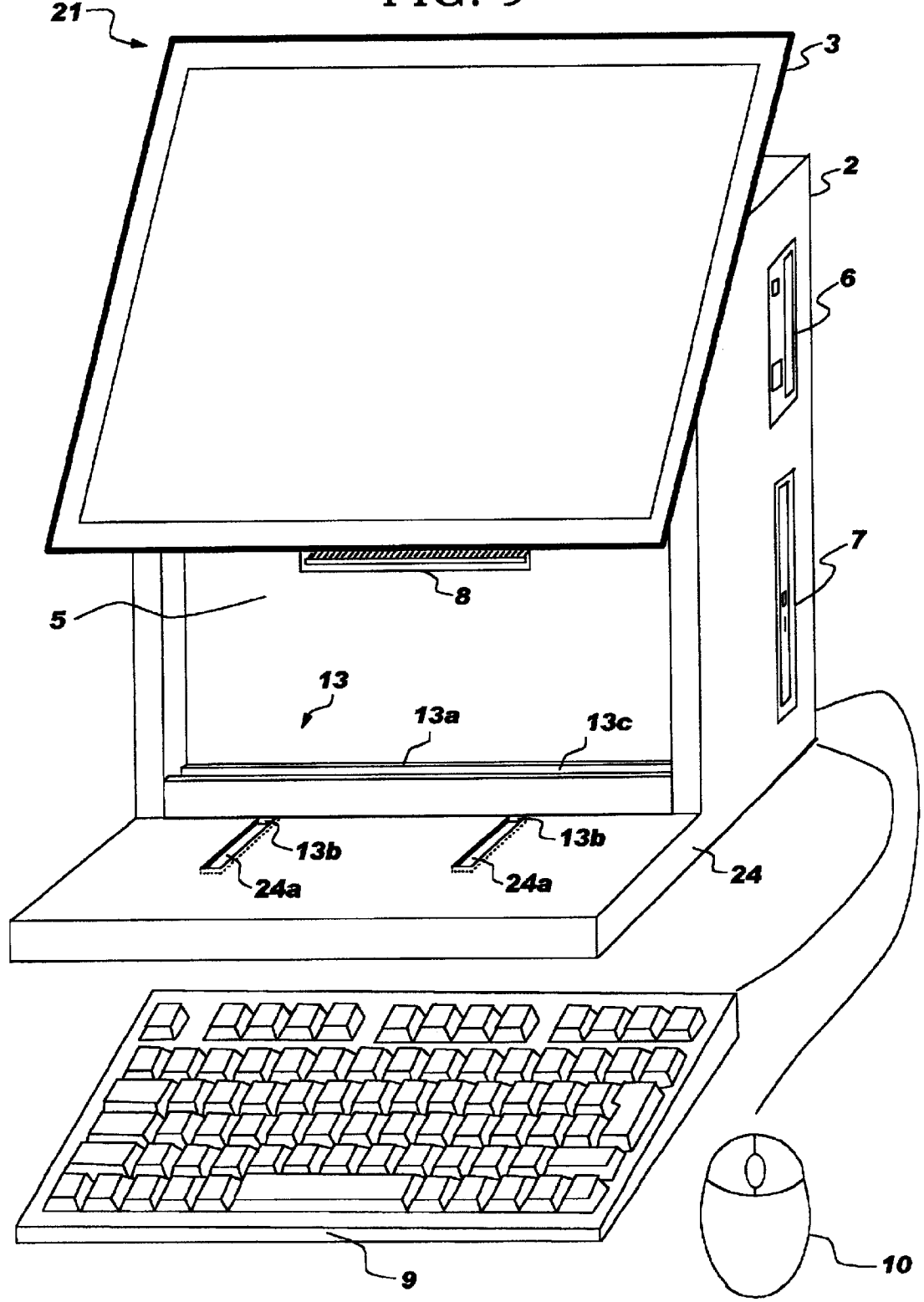
FIG. 9 is a perspective view showing an entire configuration of a docking station in a second embodiment of the present invention.

As shown in FIG. 9, the docking station 21 is provided with a sliding table 13 that can make a round movement on a fixed table 24 as denoted by the arrows. The sliding table 13 is configured by a table body 13*a* and a pair of rails 13*b* disposed at the bottom of the table body 13*a* with a predetermined space therebetween. A slit 13*c* for fitting the lap-top PC therein is formed at the table body 13*a*. When the lap-top PC 12 is fit in the slit 13*c*, the enhancement docking connector 8 of the docking station 21 and the docking connector 12*a*3 of the lap-top PC 12 are disposed so as to face each other. The pair of rails 13*b* are fit in guide grooves 24*a* formed at the fixed table 24. Consequently, the sliding table 13 can go to and return from the pocket 5 along the guide grooves 24*a*. The docking station 21 in the second embodiment is configured so that the sliding table 13 is slid towards the docking station 21 while the lap-top PC 12 is fit in the grooves 13*c*, thereby the lap-top PC 12 is housed in the pocket 5 and the enhancement docking connector 8 and the docking connector 12*a*3 are connected to each other. Hereinafter, this connection process will be described with reference to FIGS. 10 through 13.

Figure 10:
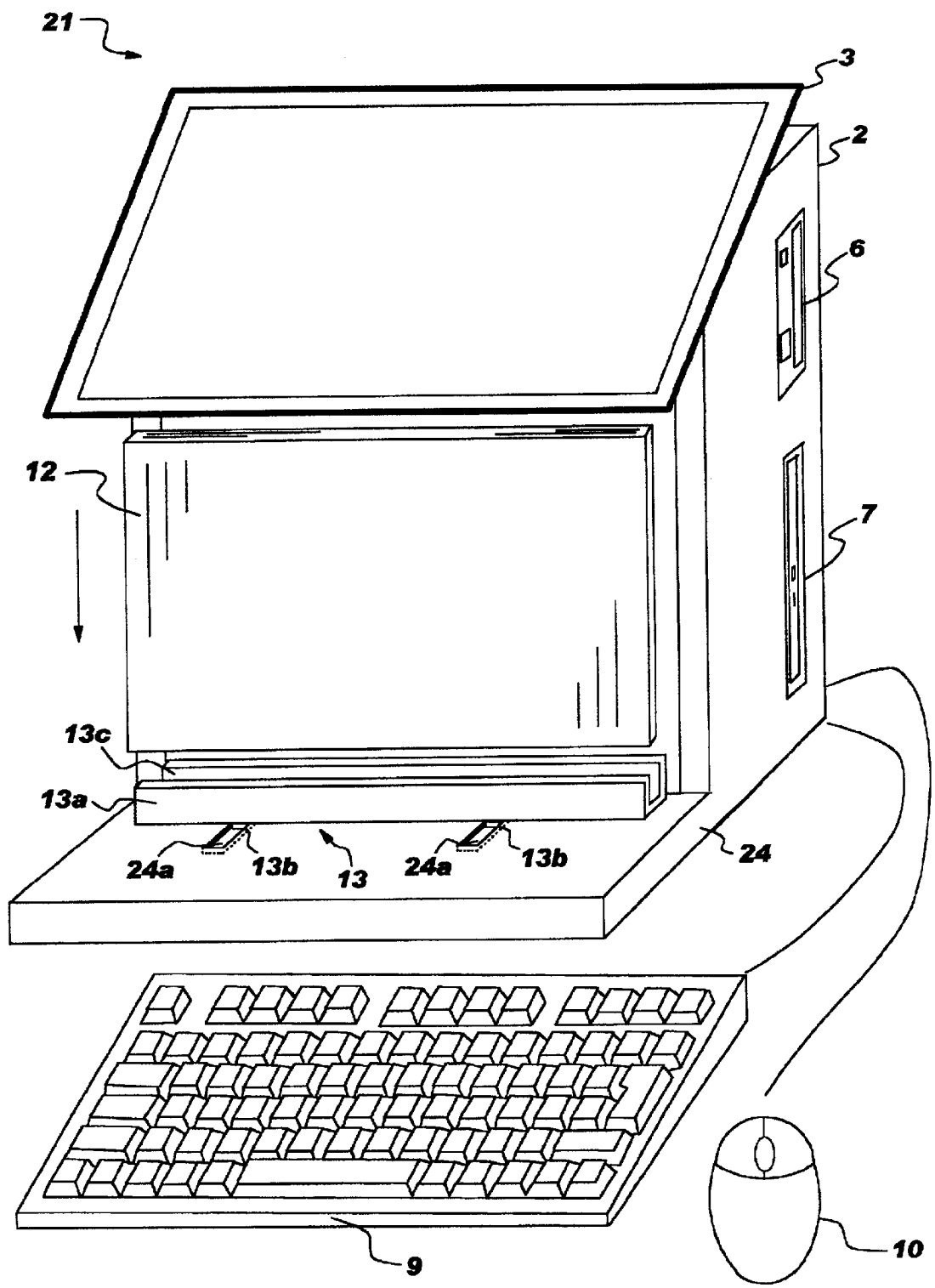
FIG. 10 is a perspective view showing how a lap-top PC is docked to the docking station in the second embodiment of the present invention.
Figure 11:
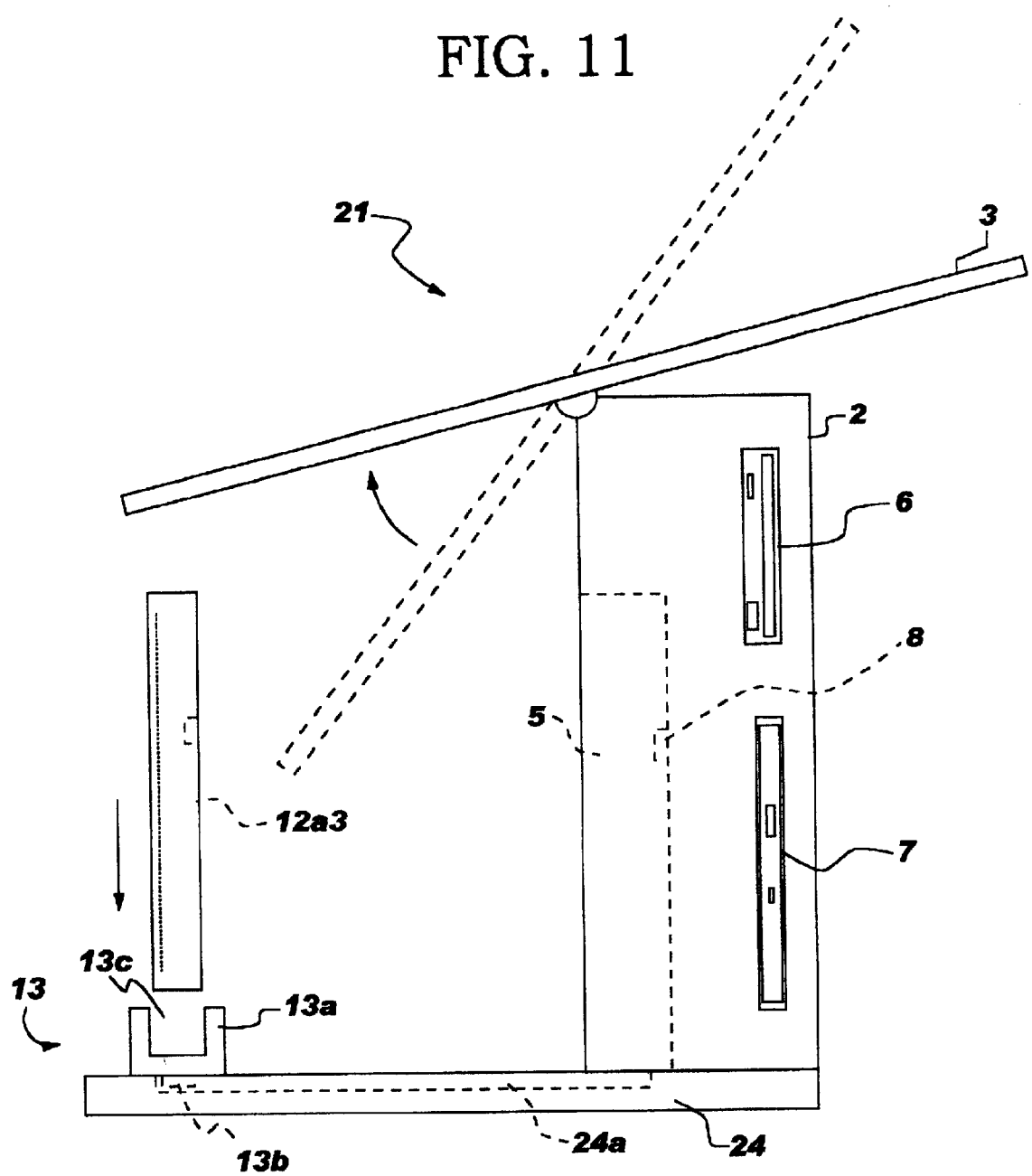
FIG. 11 is a side view showing how a lap-top PC is docked to the docking station in the second embodiment of the present invention.
Figure 12:
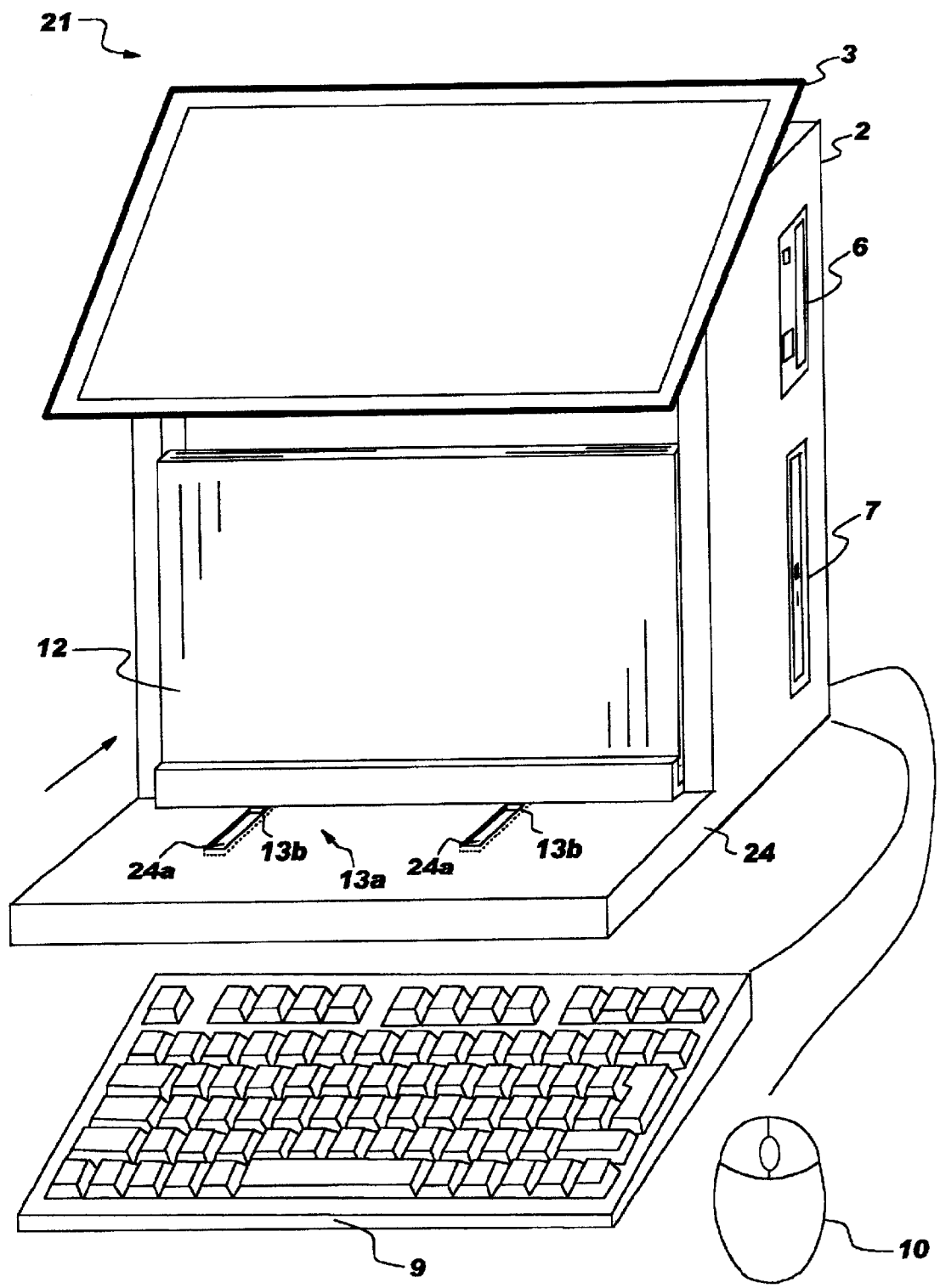
FIG. 12 is a perspective view showing how a lap-top PC is docked to the docking station in the second embodiment of the present invention.
Figure 13:
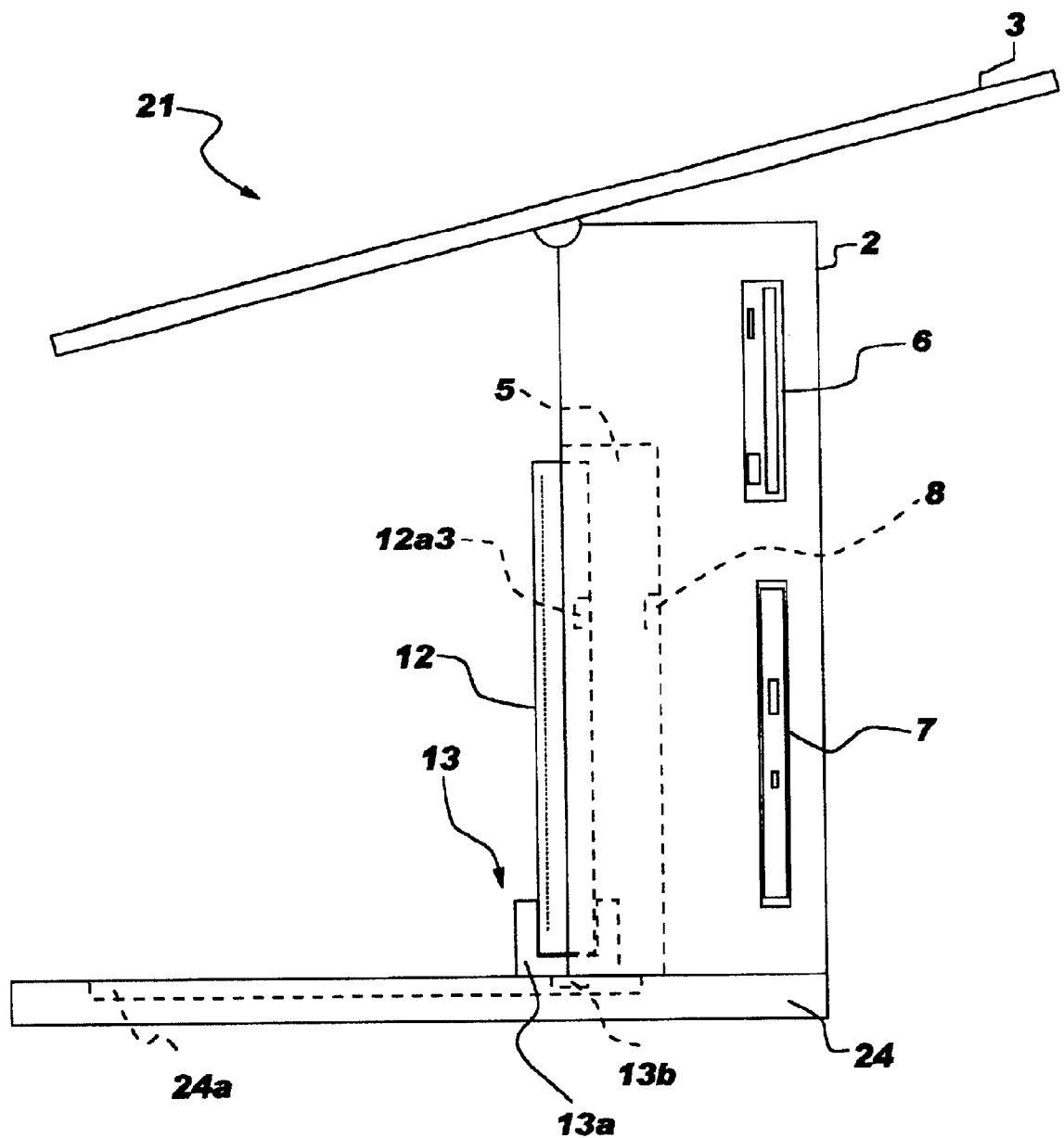
FIG. 13 is a side view showing how a lap-top PC is docked to the docking station in the second embodiment of the present invention.

The connection between the lap-top PC 12 and the docking station is done on the presumption that the liquid crystal display panel 3 is rotated clockwise with respect to the station body 2. This is to make a space for housing the lap-top PC 12 in the pocket 5. After the rotation of the liquid crystal display panel 3, the lap-top PC 12 is fit in the slit 13*c* of the sliding table 13 as shown in FIGS. 10 and 11. Then, the sliding table 13 is slid towards the pocket 5 as shown in FIGS. 12 and 13. The lap-top PC 12 is housed together with the sliding table 13 in the pocket 5 of the station body 2.

When the sliding table 13 is slid into the depth of the pocket 5, the enhancement docking connector 8 and the docking connector 12*a*3 are connected to each other.

When removing the lap-top PC 12 from the docking station 21, the sliding table 13 is slid in the direction opposite to that of the connection. Then, the enhancement docking connector 8 and the docking connector 12*a*3 are thus disconnected from each other. After this, the lap-top PC 12 can be removed from the sliding table 13.

Because the docking station 21 is also of a vertical type and the lap-top PC 12 is docked vertically to the installation surface of the docking station 21, and because the diminutive fixed table 24 vertical dimension allows the area covered by fixed table 24 to be utilized, the docking station 21 is effective for space-saving just like the docking station 1.

And, because the lap-top PC 12 can be connected to the docking station 21 from the front side of the docking station 21, their connection will be relatively easy.

Furthermore, the connection of the connectors can be done easily and surely only by sliding the lap-top PC 21 placed on the sliding table 13. Such a driving source as a motor can also be used for sliding the sliding table 13 in this instance.

Third Embodiment

Next, a third embodiment of the present invention will be described with reference to FIGS. 14 through 18.

The basic configuration of the docking station 31 in this third embodiment is the same as the docking station 1 in the first embodiment. Therefore, the same reference numerals will be given to the same items as those in the first embodiment, avoiding redundant description.

Figure 14:
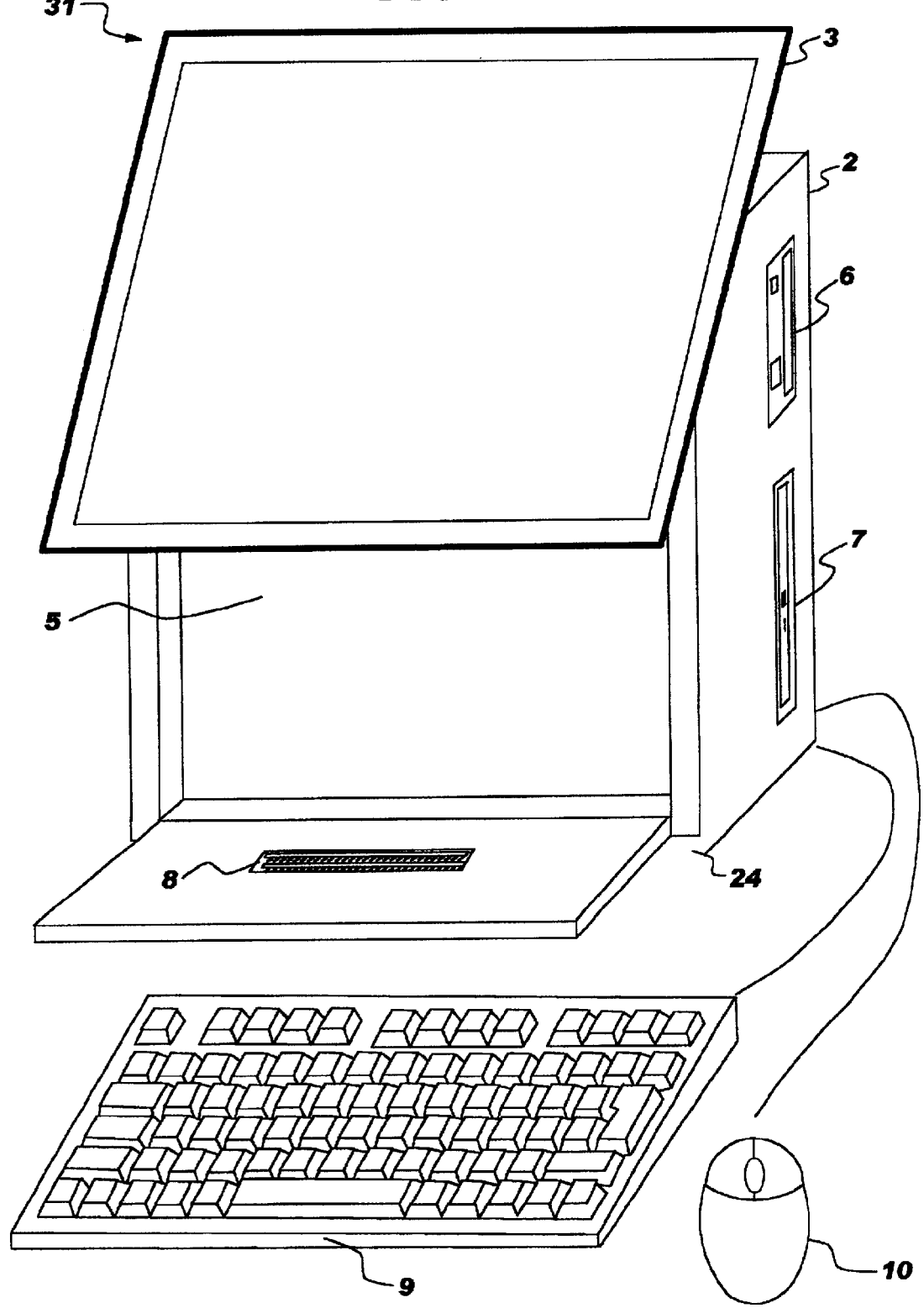
FIG. 14 is a perspective view showing an entire configuration of a docking station in a third embodiment of the present invention.
Figure 15:
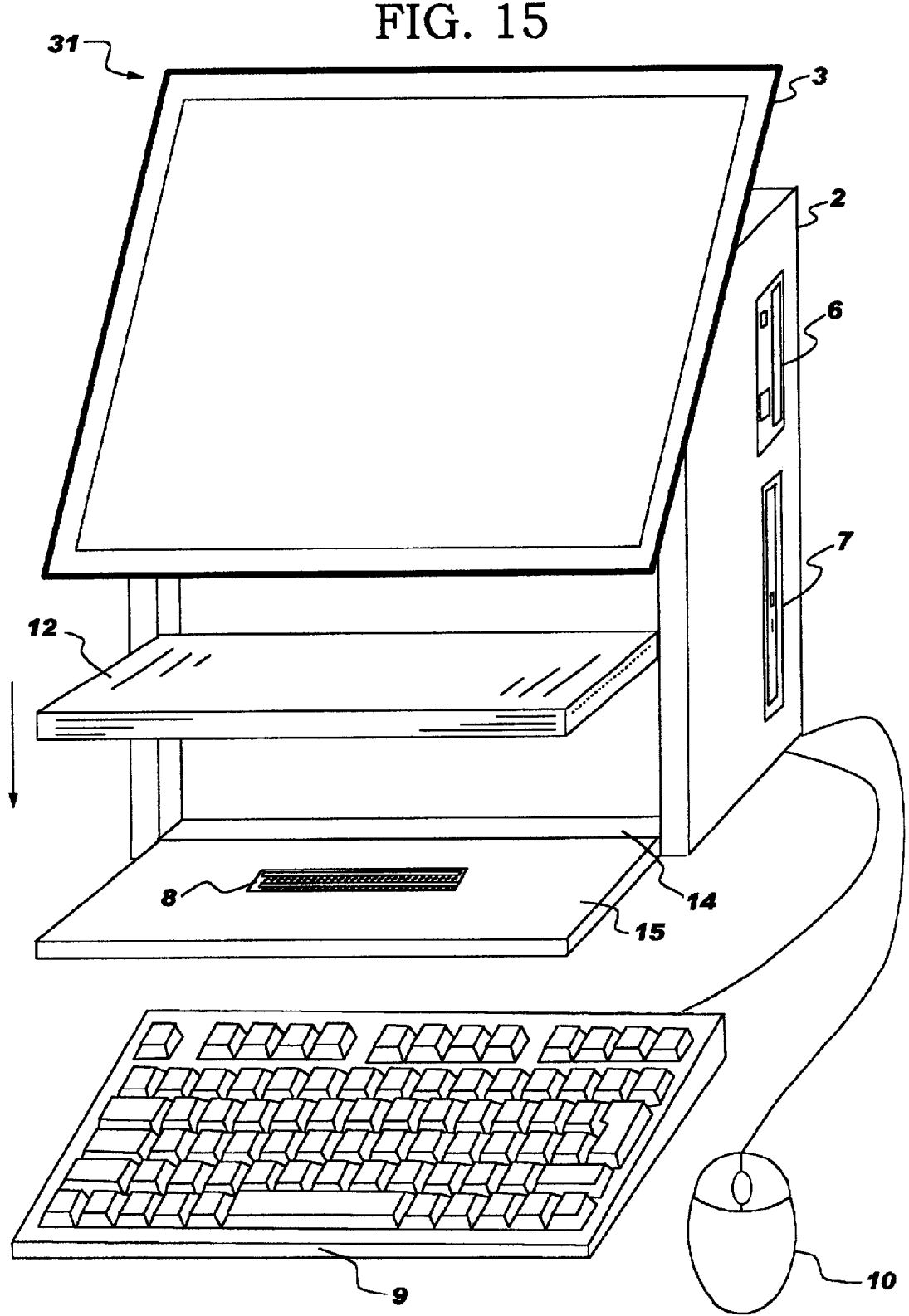
FIG. 15 is a perspective view showing how a lap-top PC is docked to the docking station in the third embodiment of the present invention.

As shown in FIGS. 14 and 15, the docking station 31 is provided with a connector unit 15 connected to the station body 2 via a flexible board 14. The enhancement docking connector 8 is provided for this connector unit 15. When the lap-top PC 12 is not connected to the docking station 31, the connector unit 15 is unfolded on a surface, such as a desk, on which the docking station 31 is installed as shown in FIG. 15.

Figure 16:
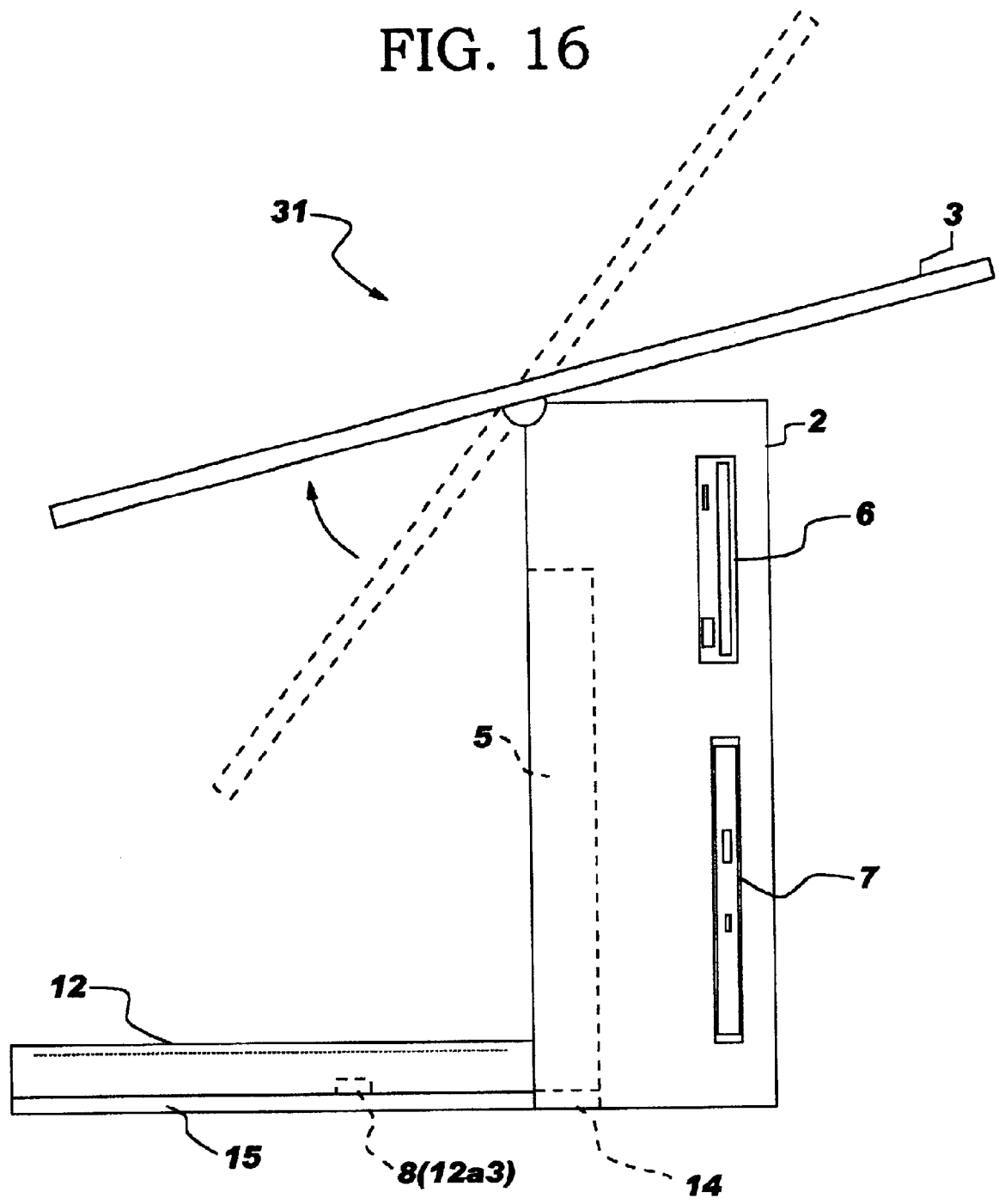
FIG. 16 is a side view showing how a lap-top PC is docked to the docking station in the third embodiment of the present invention.
Figure 17:
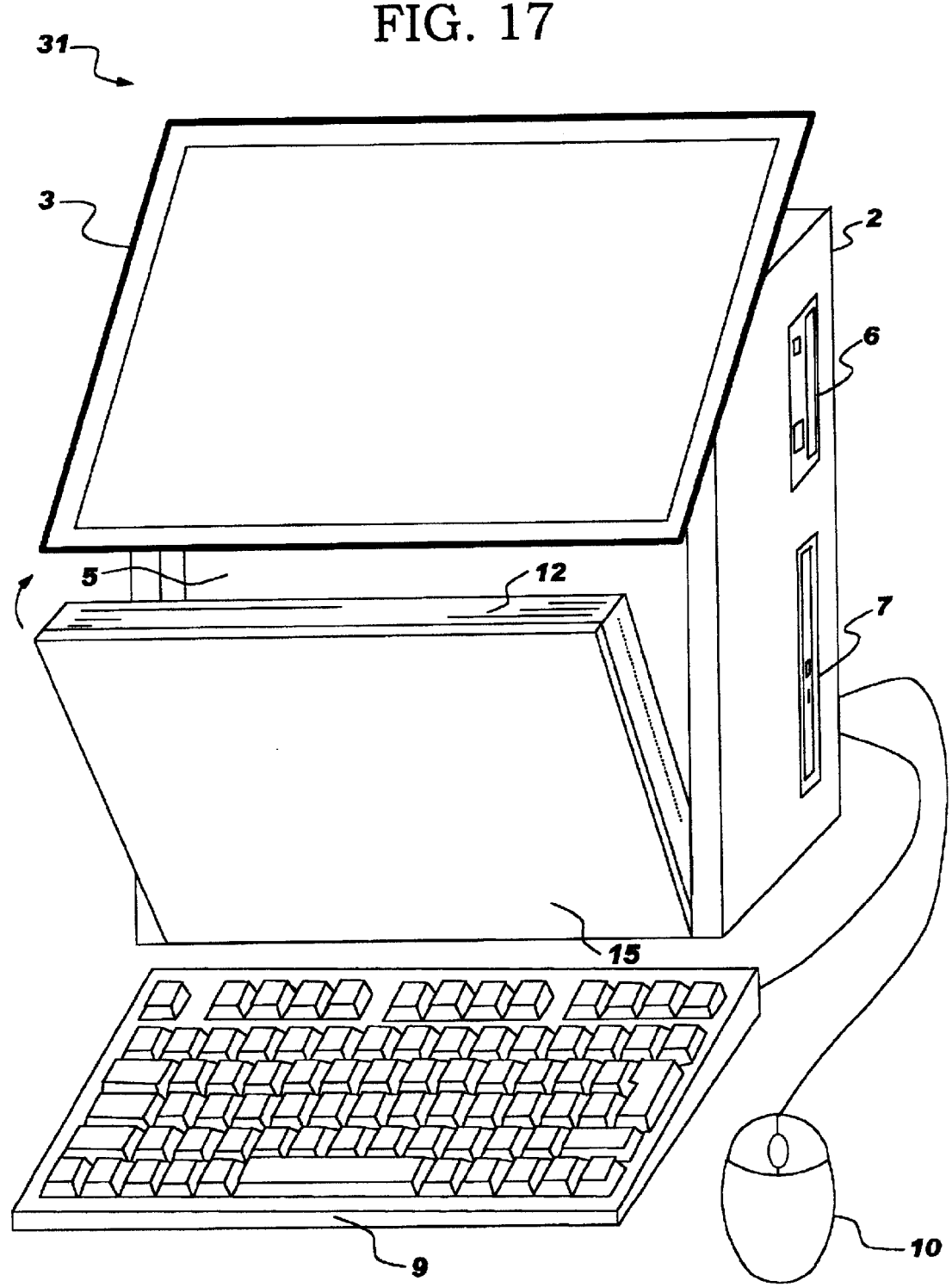
FIG. 17 is a perspective view showing how a lap-top PC is docked to the docking station in the third embodiment of the present invention.
Figure 18:
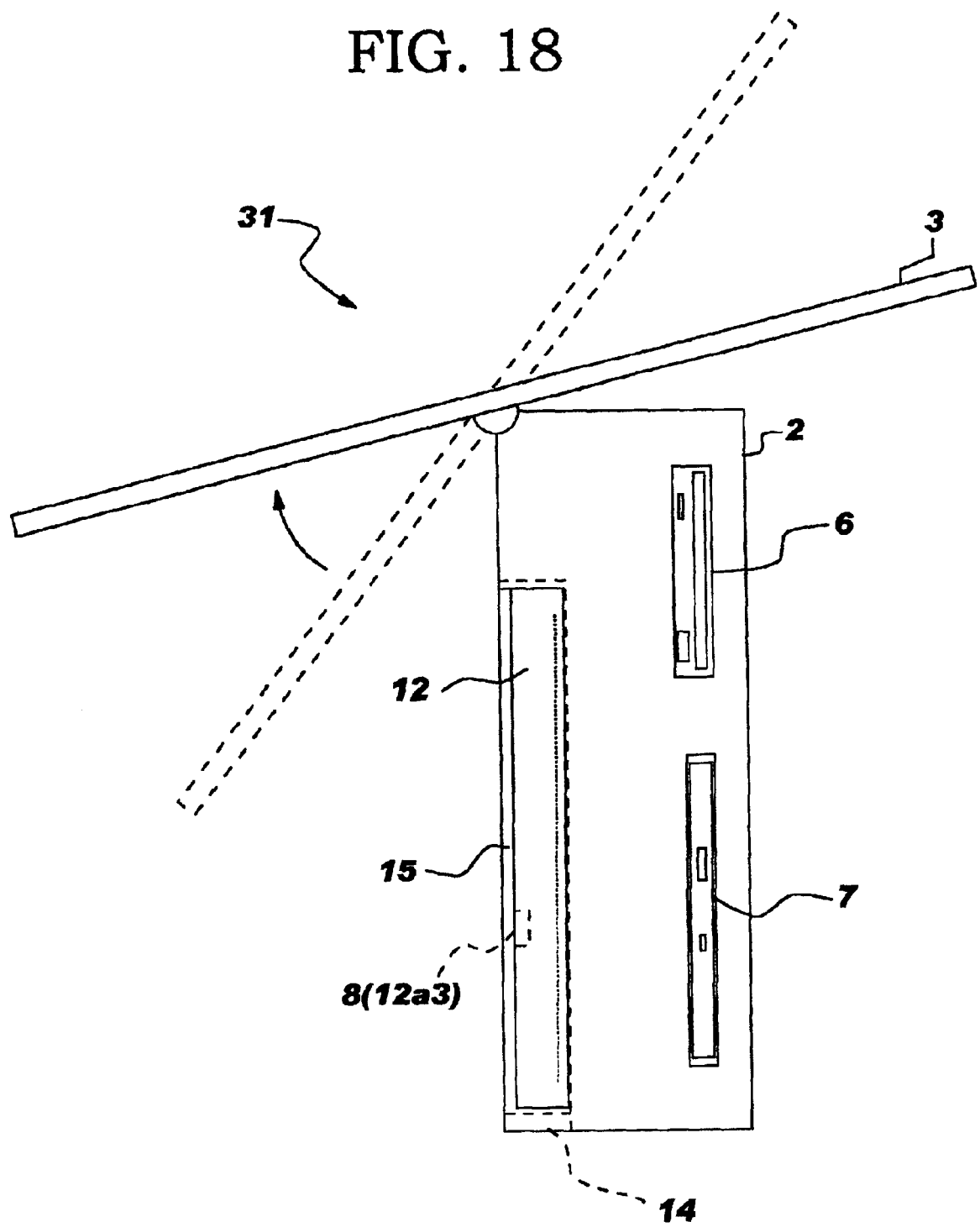
FIG. 18 is a side view showing how a lap-top PC is docked to the docking station in the third embodiment of the present invention.

When the lap-top PC 12 is docked to the docking station 31, the lap-top PC 12 is disposed in parallel to the unfolded connector unit 15 as shown in FIG. 15. In this position, the docking connector 12*a*3 of the lap-top PC 12 and the enhancement docking connector 8 of the connector unit 15 are disposed so as to face each other. When the lap-top PC 12 is placed downward, the connectors 12*a*3 and 8 can be connected to each other as shown in FIG. 16. After this connection of the connectors 12*a*3 and 8, the lap-top PC 12 is rotated around the station body 2 side of the lap-top PC 12 as shown in FIG. 17. At the time of this rotation, the flexible board 14 is bent/flexed. While the lap-top PC 12 is kept rotated, the lap-top PC 12 is housed in the pocket 5 of the station body 2 as shown in FIG. 18.

Because the docking station 31 in the third embodiment is also of a vertical type, space-saving is achieved just like the docking station 1.

Furthermore, according to the docking station 31 in the third embodiment, the docking connectors 12*a*3 and 8 can be connected to each other by pressing the lap-top PC 12 horizontally against the installation surface. Consequently, the docking station 31 in the third embodiment enables the docking connectors 12*a*3 and 8 to be connected more easily and surely than the docking station 1 in the first embodiment.

Fourth Embodiment

Figure 19:
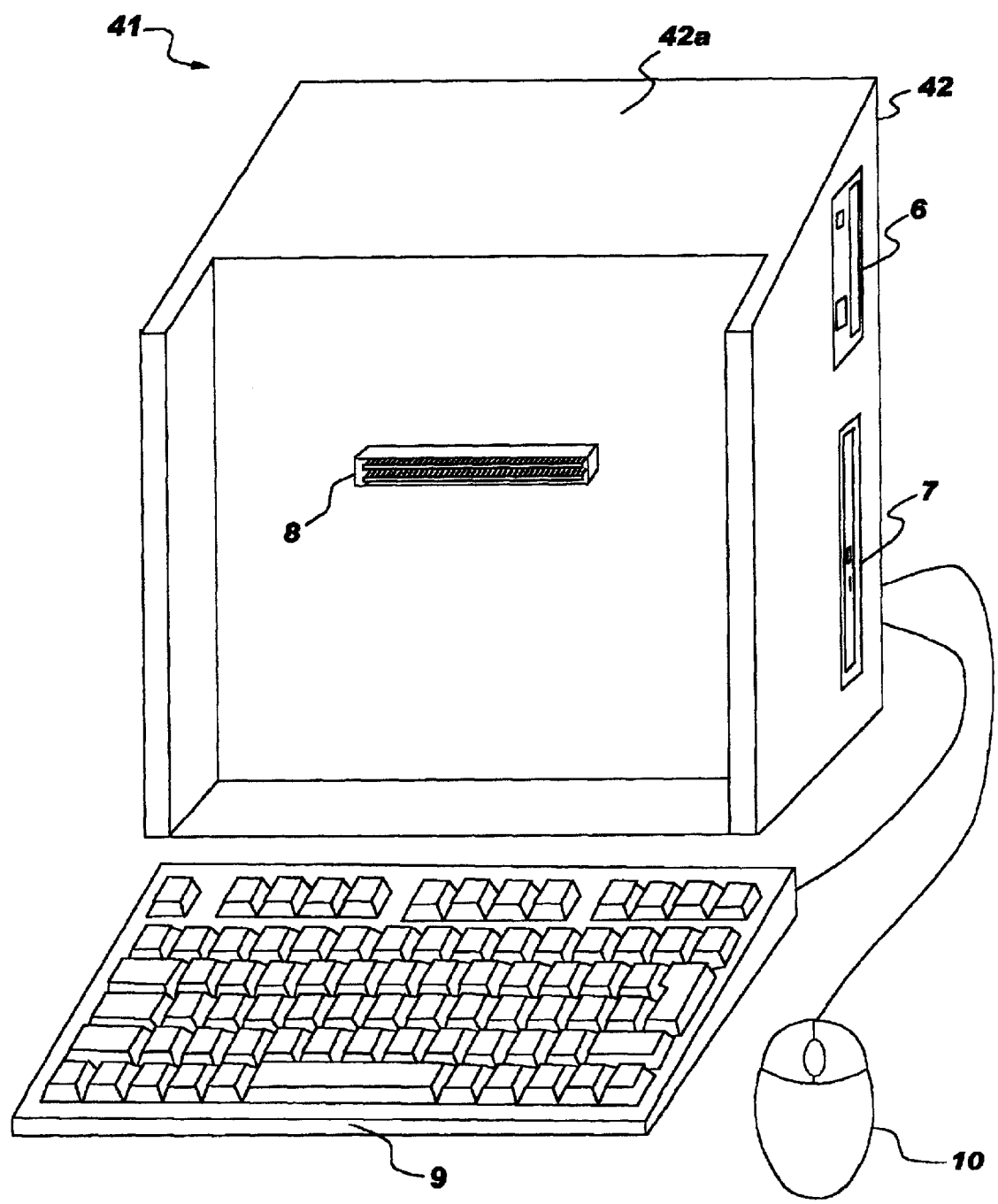
FIG. 19 is an entire configuration of a docking station in a fourth embodiment of the present invention.

Next, a fourth embodiment of the present invention will be described with reference to FIGS. 19 through 21.

The basic configuration of the docking station 41 in this fourth embodiment is the same as the docking station 1 in the first embodiment. Therefore, the same reference numerals will be given to the same items as those in the first embodiment, avoiding redundant description.

In the fourth embodiment, the docking station 41 is not provided with the liquid crystal display panel 3. This is only a difference from the docking station in the first embodiment. The docking station 41 in the fourth embodiment, when the lap-top PC 12 is connected thereto, uses the image display unit 12b of the lap-top PC 12 as such a display.

The docking station 41 has an inclined plane 42a on which the top surface of the station body 42 declines gradually from rear to front.

Figure 20:
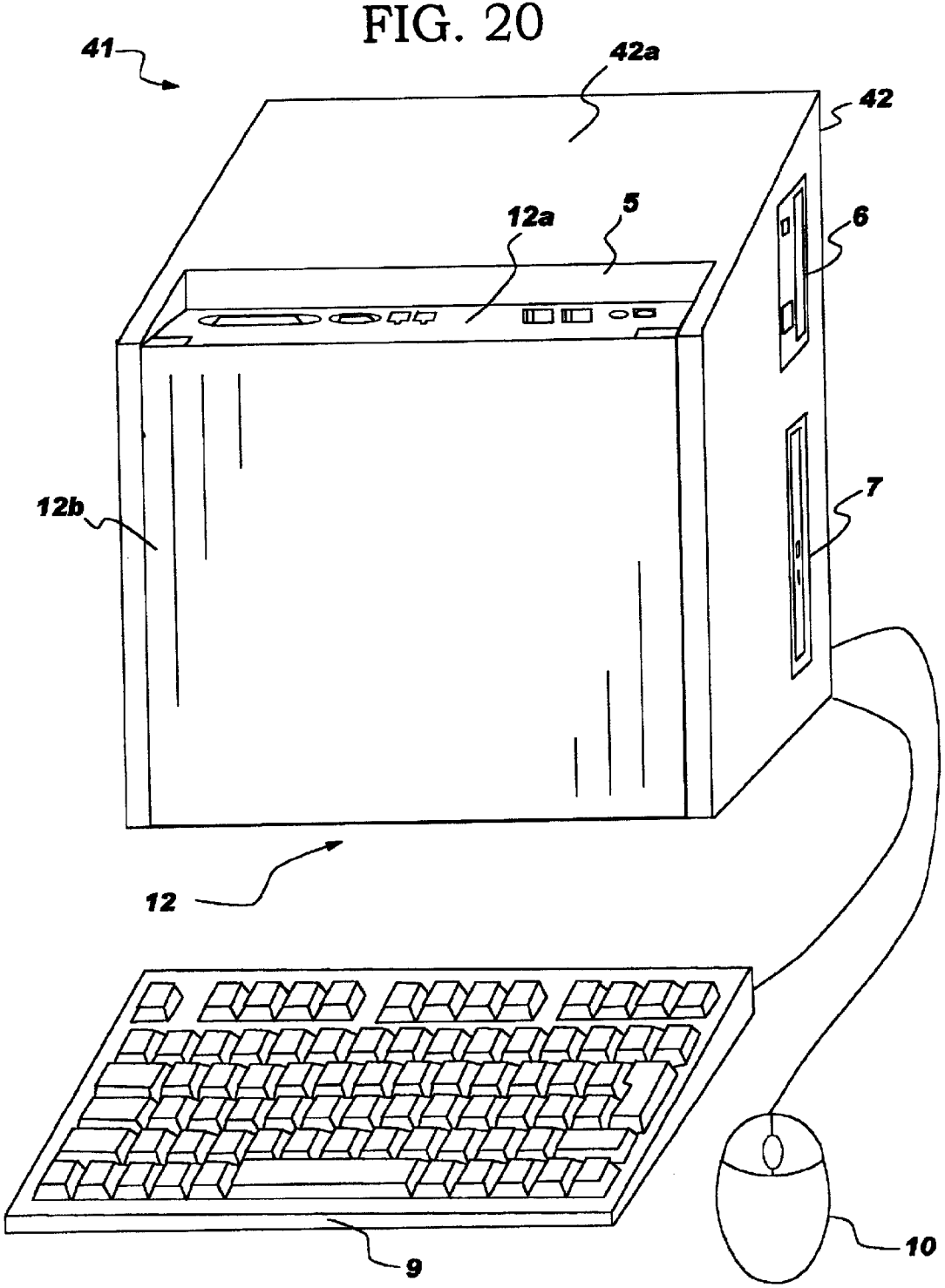
FIG. 20 is a perspective view showing how a lap-top PC is docked to the docking station in the fourth embodiment of the present invention.
Figure 21:
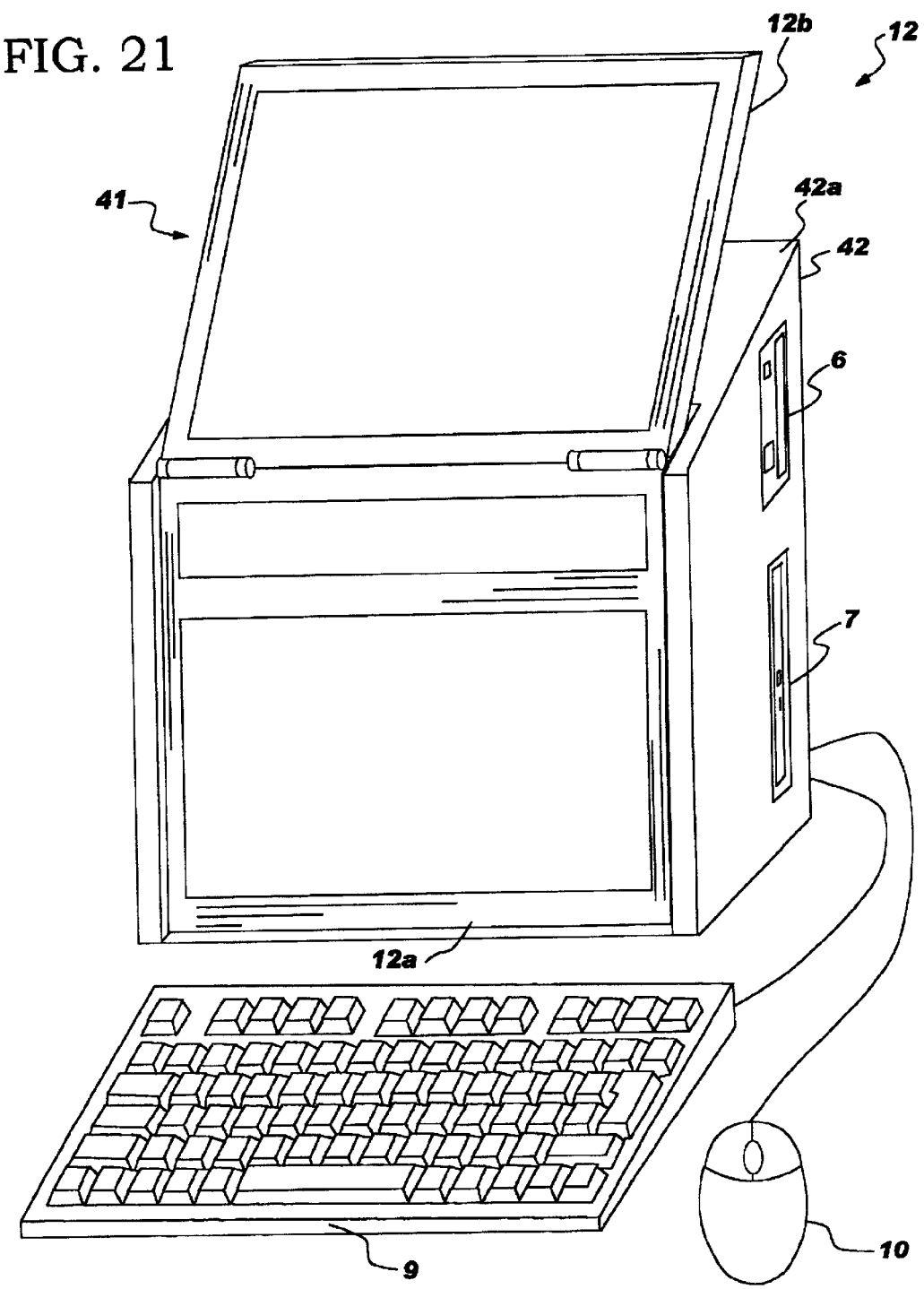
FIG. 21 is a perspective view of an opened display of a lap-top PC docked to the docking station in the fourth embodiment of the present invention.

FIG. 20 shows how the lap-top PC 12 is docked to the docking station 41. This docking is done almost in the same process as that in the first embodiment. The docking is done so as to position the common rotation axis of the lap-top PC 12 body and the image display unit 12b above its center.

The image display unit 12b is opened as shown in FIG. 20. FIG. 21 shows how the image display unit 12b is opened. The user of the docking station 41 can thus use the image display unit 12b of the lap-top PC 12 as a display of the docking station 41. When in the normal use of the lap-top PC 12, the image display unit 12b is opened by 90 to 130° to the body 12a. In this fourth embodiment, however, as shown in FIG. 21, the image display unit 12b is opened by more than 180° to the body 12a. This is because the user feels uncomfortable to watch images displayed on the screen in the case where the opening angle is less than 180°. This is why the image display unit 12b of the lap-top PC 12 should be opened by more than 180° to the body 12a. Lap-top PCs available now on the market cannot open the image display unit 12b by more than 180° to the body 12a. Consequently, it can be said that the lap-top PC 12 in this embodiment includes a novelty in the opening angle of the image display unit 12b to the body 12a. Furthermore, because the docking station 41 has the top plane 42a of the station body 42, which declines from rear to front, it is possible to avoid a collision that might occur between the image display unit 12b and the docking station body 42 which might prevent the opening of the image display unit 12b by more than 180°.

Because the docking station 41 described above is also a vertical type, it is effective in space-saving just like the docking station 1. And, because the lap-top PC 12 can be connected to the docking station 41 from the front side of the docking station 41, this makes the connection of their connectors easier. In addition, because there is no need to provide the liquid crystal display panel 3 for the docking station 41, it is also effective in the reduction of the manufacturing cost and of the cost to the end user.

In the drawings and specifications there have been set forth preferred embodiments of this invention and, although specific terms are used, the description thus given uses terminology in a generic and descriptive sense only and not for purposes of limitation.

What is claimed is:

1. An apparatus comprising:
   a housing defining a mounting surface having a pocket formed therein, wherein the mounting surface is a surface on said housing selected from the group consisting of a surface with the largest area and a surface essentially parallel to a plane containing the surface with the largest area;
   an enhancement connector, disposed on the pocket, and which supports connection to a plurality of I/O ports of a portable information processing apparatus;
   a holding member, coupled to said housings which holds the portable information processing apparatus in a closed position, and substantially vertical to said housing and in connection with said enhancement connector.

2. The apparatus according to claim 1, further comprising:
   a display unit attached to said housing so as to be adjustable in position.

3. The apparatus according to claim 1, wherein said housing houses a device which extends the function of the portable information processing apparatus.

4. An apparatus comprising:
   a housing, having a mounting surface wherein the mounting surface is a surface on said housing selected from the group consisting of a surface with the largest area and a surface essentially parallel to a plane containing the surface with the largest area, and adapted to house a portable information processing apparatus in a closed position substantially vertical to an installation surface on which the portable information processing apparatus is installed;
   an enhancement connector, disposed on said housing, which supports connections of a plurality of I/O ports of the portable information processing apparatus; and
   a stopper, coupled to the mounting surface, which supports the portable information processing apparatus to be connected to said housing;
   wherein the mounting surface of said housing initially enables the portable information processing apparatus to be downwardly connected to said housing in a direction opposed by the installation surface.

5. The apparatus according to claim 4;
   wherein said stopper is rail mounted and holds the portable information processing apparatus substantially vertical to the installation surface and slidable toward and away from the mounting surface.

6. An apparatus comprising:
   a housing having a mounting surface wherein the mounting surface is a surface on said housing selected from the group consisting of a surface with the largest area and a surface essentially parallel to a plane containing the surface with the largest area, and adapted to house a portable information processing apparatus in a closed position substantially vertical to an installation surface on which the portable information processing apparatus is installed;
   an enhancement connector, disposed on said housing, which supports connections of a plurality of I/O ports of the portable information processing apparatus; and
   a stopper, coupled to the mounting surface, which supports the portable information processing apparatus to be connected to said housing;
   wherein said housing further includes a pocket on the mounting surface having an opening substantially vertical to the installation surface, and
   said stopper is formed at any one of four side walls of said pocket.

7. A processing apparatus, comprising:
   a vertically oriented connection enhancement apparatus adapted to support connections of a plurality of I/O ports and defining a front surface having a pocket formed therein, wherein the front surface is a surface on said connection enhancement apparatus selected from the group consisting of a surface with the largest area and a surface essentially parallel to a piano containing the surface with the largest area;

a portable information processing apparatus removably attached to said connection enhancement apparatus from the front facing surface side; and a holding members coupled to said connection enhancement apparatus, which holds the portable information processing apparatus in a closed position and a substantially vertical orientation and in connection with said connection enhancement apparatus.

8. An apparatus comprising:

a housing defining a mounting surface having a pocket formed therein, wherein the mounting surface is a surface on said housing selected from the group consisting of the surface with the largest area and the surface essentially parallel to a plane containing the surface with the largest area;

a rotatable member extended from said housing; and an enhancement connector, disposed on said rotatable member, which supports connection to a plurality of I/O posts of a portable information processing apparatus;

wherein said rotatable member is rotatably movable from an initial horizontal position to the installed vertical position and supports the portable information processing apparatus in a closed position.

* * * * *